US011825116B2

(12) United States Patent
Xiu et al.

(10) Patent No.: US 11,825,116 B2
(45) Date of Patent: Nov. 21, 2023

(54) PREDICTIVE CODING FOR 360-DEGREE VIDEO BASED ON GEOMETRY PADDING

(71) Applicant: VID SCALE, INC., Wilmington, DE (US)

(72) Inventors: Xiaoyu Xiu, San Diego, CA (US); Yuwen He, San Diego, CA (US); Yan Ye, San Diego, CA (US)

(73) Assignee: VID Scale, Inc., Wilmington, DE (US)

( * ) Notice: Subject to any disclaimer, the term of this patent is extended or adjusted under 35 U.S.C. 154(b) by 0 days.

(21) Appl. No.: 17/690,996

(22) Filed: Mar. 9, 2022

(65) Prior Publication Data

US 2022/0201327 A1 Jun. 23, 2022

Related U.S. Application Data

(63) Continuation of application No. 16/494,835, filed as application No. PCT/US2018/022658 on Mar. 15, 2018, now Pat. No. 11,277,635.

(Continued)

(51) Int. Cl.
*H04N 19/563* (2014.01)
*H04N 19/105* (2014.01)
(Continued)

(52) U.S. Cl.
CPC ......... *H04N 19/563* (2014.11); *H04N 19/105* (2014.11); *H04N 19/176* (2014.11); *H04N 19/597* (2014.11)

(58) Field of Classification Search
None
See application file for complete search history.

(56) References Cited

U.S. PATENT DOCUMENTS 6,389,074 B1   5/2002 Andrew
10,477,238 B2  11/2019 Jin et al.
(Continued)

FOREIGN PATENT DOCUMENTS

JP   2003-179938 A   6/2003
JP   2012-191512 A   10/2012

OTHER PUBLICATIONS

Abbas, Adeel, "GoPro Test Sequences for Virtual Reality Video Coding", JVET-C0021, GoPro, Joint Video Exploration Team (JVET) of ITU-T SG 16 WP 3 and ISO/IEC JTC 1/SC 29/WG 11, 3rd Meeting: Geneva, CH, May 26-31, 2016, 10 pages.

(Continued)

*Primary Examiner* — Lindsay J Uhl
(74) *Attorney, Agent, or Firm* — Condo Roccia Koptiw LLP

(57) ABSTRACT

A video coding system (e.g., an encoder and/or a decoder) may perform face-based sub-block motion compensation for 360-degree video to predict samples (e.g., of a sub-block). The video coding system may receive a 360-degree video content. The 360-degree video content may include a current block. The current block may include a plurality of sub-blocks. The system may determine whether a sub-block mode is used for the current block. The system may predict a sample in the current block based on the sub-block level face association. For a first sub-block in the current block, the system may identify a first location of the first sub-block. The system may associate the first sub-block with a first face based on the identified first location of the first sub-block. The system may predict a first sample in the first sub-block based on the first face that is associated with the first sub-block.

20 Claims, 25 Drawing Sheets

Related U.S. Application Data

(60) Provisional application No. 62/473,105, filed on Mar. 17, 2017.

(51) Int. Cl.
   H04N 19/176 (2014.01)
   H04N 19/597 (2014.01)

(56) References Cited

U.S. PATENT DOCUMENTS

| | | |
|---|---|---|
| 2007/0217508 A1 | 9/2007 | Shimada et al. |
| 2014/0153645 A1 | 6/2014 | Zhang et al. |
| 2015/0201212 A1 | 7/2015 | Zhang et al. |
| 2016/0255369 A1 | 9/2016 | Nam et al. |
| 2017/0374385 A1 | 12/2017 | Huang et al. |
| 2018/0103199 A1* | 4/2018 | Hendry .......... H04N 21/440227 |
| 2018/0160123 A1 | 6/2018 | Van Der Auwera et al. |
| 2022/0210465 A1 | 6/2022 | Kondow |

OTHER PUBLICATIONS

Bang et al., "Description of 360 3D Video Application Exploration Experiments on Divergent Multi-View Video", ISO/IEC JTC1/SC29/WG11 MPEG2015/ M16129, Requirements, San Diego, US, Feb. 2016, 5 pages.

Boyce et al., "JVET Common Test Conditions and Evaluation Procedures for 360° Video", JVET-D1030_V1, Editors, Joint Video Exploration Team (JVET) of ITU-T SG 16 WP 3 and ISO/IEC JTC1/SC 29/WG 11, 4th Meeting: Chengdu, CN, Oct. 15-21, 2016, pp. 1-6.

Chen et al., "Algorithm Description of Joint Exploration Test Model 5", JVET-E1001-V1, Editors, Joint Video Exploration Team (JVET) of ITU-T SG 16 WP 3 and ISO/IEC JTC 1/SC 29/WG 11, 5th Meeting: Geneva, CH, Jan. 12-20, 2017, 45 pages.

Choi, Byeongdoo, "Technologies Under Consideration for Omnidirectional Media Application Format", Systems Subgroup, ISO/IEC JTC1/SC29/WG11 N15946, San Diego, CA, US, Feb. 2016, 16 pages.

Facebook360, "Facebook 360 Video", Available at <https://facebook360.fb.com/>, pp. 1-5.

Github, "Facebook's Equirectangular to Cube Map Tool on GitHub", Transform 360, Available at <https://github.com/facebook/transform?files=1>, pp. 1-3.

Google VR, "Google Cardboard", Available at <https://www.google.com/get/cardboard/>, pp. 1-4.

Hanhart et al., "AHG8: Reference Samples Derivation Using Geometry Padding for Intra Coding", JVET-D0092, InterDigital Communications Inc., Joint Video Exploration Team (JVET) of ITU-T SF 16 WP 3 and ISO/IEC JTC 1/SC 29/WG 11, 4th Meeting: Chengdu, CN, Oct. 15-21, 2016, pp. 1-6.

He et al., "AHG8: Geometry Padding for 360 Video Coding", JVET-D0075, InterDigital Communications Inc., Joint Video Exploration Team (JVET) of ITU-T Sg 16 WP 3 and ISO/IEC JTC1/SC 29/WG 11, 4th Meeting: Chengdu, CN, Oct. 15-21, 2016, pp. 1-10.

HTC, "HTC Vive", Available at <https://www.htcvive.com/us/>, pp. 1-3.

ISO/IEC, "Requirements for OMAF", Requirements, ISO/IEC JTC1/SC29/WG11 N16143, San Diego, CA, US, Feb. 2016, 2 pages.

Kuzyakov et al., "Next-Generation Video Encoding Techniques for 360 Video and VR", Facebook Code, Available at <https://code.facebook.com/posts/1126354007399553/next-generation-video-encoding-techniques-for-360-video-and-vr/>, Jan. 21, 2016, pp. 1-6.

Leannec et al., "Asymmetric Coding Units in QTBT", JVET-D0064, Technicolor, Joint Video Exploration Team (JVET) of ITU-T SG 16 WP 3 and ISO/IEC JTC 1/SC 29/WG 11, 4th Meeting: Chengdu, CN, Oct. 15- 21, 2016, pp. 1-8.

Li et al., "Multi-Type-Tree", JVET-D0117, Qualcomm Inc., Joint Video Exploration Team (JVET) of ITU-T SG 16 WP 3 and ISO/IEC JTC 1/SC 29/WG 11, 4th Meeting: Chengdu, CN, Oct. 15-21, 2016, pp. 1-3.

Norkin et al., "Call for Test Materials for Future Video Coding Standardization", JVET-B1002, ITU-T Q6/16 Visual Coding (VCEG) and ISO/IEC JTC1/SC29/WG11 Coding of Moving Pictures and Audio (MPEG), Joint Video Exploration Team (JVET) of ITU-T SG 16 WP 3 and ISO/IEC JTC 1/SC 29/WG 11, 2nd Meeting: San Diego, USA, Feb. 20-26, 2016, pp. 1-4.

Oculus, "Oculus Rift", Available at <https://www.oculus.com/en-us/rift/>, pp. 1-19.

Shih et al., "AHG8: Face-Based Padding Scheme for Cube Projection", JVET-E0057, MediaTek Inc., Joint Video Exploration Team (JVET) of ITU-T SG 16 WP 3 and ISO/IEC JTC1/SC 29/WG 11, 5th Meeting: Geneva, CH, Jan. 12-20, 2017, pp. 1-5.

Thomas et al., "5G and Future Media Consumption", TNO, ISO/IEC JTC1/SC29/WG11 MPEG2016/m37604, San Diego, CA, US, Feb. 2016, 10 pages.

Wien et al., "Preliminary Joint Call for Evidence on Video Compression with Capability Beyond HEVC", JVET-E1002, JVET, Joint Video Exploration Team (JVET) of ITU-T SG 16 WP 3 and ISO/IEC JTC 1/SC 29/WG 11, 5th Meeting: Geneva, CH, Jan. 12-20, 2017, pp. 1-9.

* cited by examiner

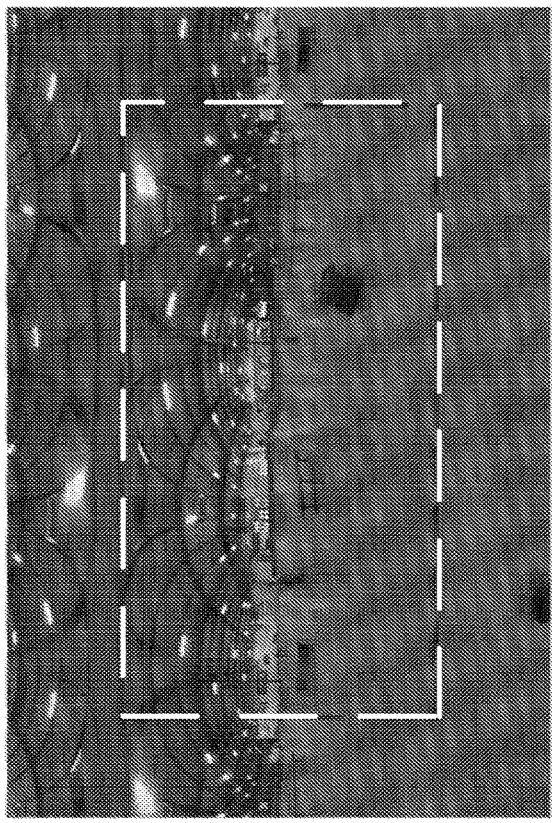
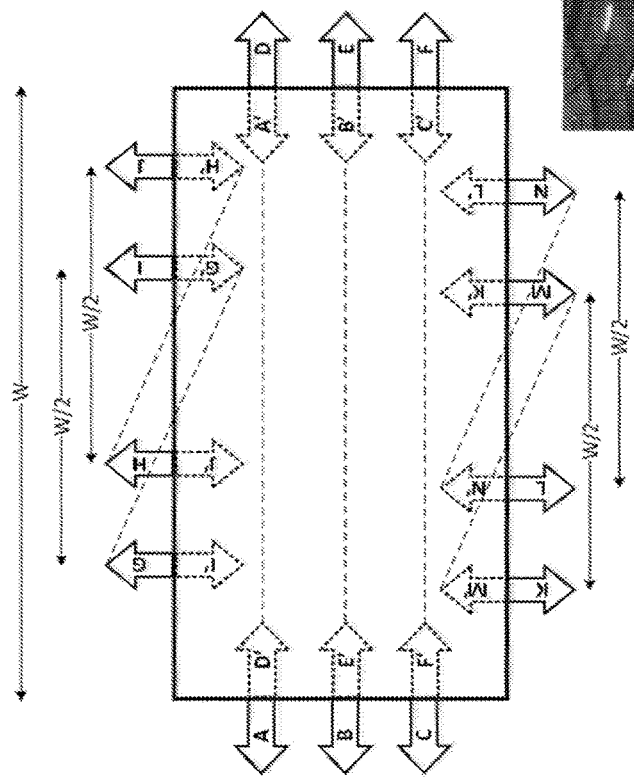
FIG. 5A
FIG. 5B

PREDICTIVE CODING FOR 360-DEGREE VIDEO BASED ON GEOMETRY PADDING

CROSS-REFERENCE TO RELATED APPLICATION

This application is a Continuation Application of U.S. patent application Ser. No. 16/494,835, filed Sep. 17, 2019, which is the National Stage Entry under 35 U.S.C. § 371 of Patent Cooperation Treaty Application No. PCT/US2018/022658, filed Mar. 15, 2018, which claims the benefit of U.S. Provisional Application Ser. No. 62/473,105 filed Mar. 17, 2017, the contents of which are incorporated by reference herein.

BACKGROUND

Virtual reality (VR) started to go into our daily lives. For example, VR has many applications in areas including, but not limited to, healthcare, education, social networking, industry design/training, game, movie, shopping, and/or entertainment VR may bring an immersive viewing experience by creating a virtual environment surrounding a viewer. VR may generate a true sense of "being there" for the viewer. User's experience may rely on, for example, providing a full real feeling in the VR environment. For example, the VR system may support interactions through posture, gesture, eye gaze, and/or voice. The VR system may provide haptic feedback to the user to allow the user to interact with objects in the VR world in a natural way. VR systems may use 360-degree video to provide the users, for example, the capability to view the scene from 360-degree angles in the horizontal direction and/or 180-degree angles in the vertical direction. The VR system and/or 360-degree video may be mega consumption beyond, for example, Ultra High Definition (UHD) service.

SUMMARY

A video coding system may perform face-based sub-block motion compensation for 360-degree video to predict one or more samples of a sub-block. The video coding system may include an encoder and/or a decoder. The video coding system may receive a 360-degree video content. The 360-degree video content may Include multiple faces. For example, the 360-degree video content may include multiple faces arranged in a frame-packed picture. The 360-degree video content may include a current block. The current block may include one or more sub-blocks. For examples, the current block may be divided into one or more sub-blocks. Sub-block level face association may be performed to the 360-degree video content. For example, when a sub-block mode is used for the current block, sub-block level face association may be performed based on the location(s) of the sub-block(s) in the frame-packed picture associated with the 360-degree video content.

In examples, the sub-block mode may include at least one of an advanced temporal motion vector prediction (ATMVP) mode, a spatial-temporal motion vector prediction (STMVP) mode, frame-rate up conversion (FRUC) mode, or an affine mode.

The video coding system may determine whether the current block includes samples located on multiple faces associated with the 360-degree video content. The system may predict one or more samples in the current block. For example, the system may predict one or more samples in the current block based on sub-block level face association. The system may perform geometry padding on the multiple faces. The faces may include a padded region associated with the face. For example, the first face may include a padded region associated with the first face.

In examples, for a first sub-block in the current block, the system may identify a first location of the first sub-block. The system may associate the first sub-block with a first face. For example, the system may associate the first sub-block with the first face based on the identified first location of the first sub-block. The system may predict a first sample in the first sub-block. For example, the system may predict the first sample in the first sub-block based on the first face that is associated with the first sub-block.

The system may predict the first sample associated with the first sub-block by identifying a reference sample associated with the first face. For example, the system may identify a reference sample associated with the first face using a motion vector. The system may predict the first sample in the first sub-block based on the identified reference sample. For example, the system may predict the first sample in the first sub-block using the identified reference sample. The identified reference samples may be associated with the first face or a padded region of the first face. For example, the identified reference samples may be located within the first face or a padded region of the first face.

In examples, for a second sub-block in the current block, the system may identify a second location of the second sub-block. The system may associate the second sub-block with a second face. For example, the system may associate the second sub-block with the second face based on the identified second location of the second sub-block. The system may predict a second sample in the second sub-block. For example, the system may predict the second sample in the second sub-block based on the second face that is associated with the second sub-block. The second face described herein may differ from the first face.

If the first sub-block is associated with the first face and a second sub-block is associated with a second face and the first face differs from the second face, the system may predict the first sample using a first reference sample that is/modeled with the first face and may predict the second sample using a second reference sample that is associated with the second face.

BRIEF DESCRIPTION OF THE DRAWINGS

FIGS. 5A and 5B depict examples of geometry padding for ERP (a) paddling geometry; and (b) padded ERP picture.

FIGS. 13A and 138 depict examples of frame-rate up conversion (FRUC) in (a) template-matching; and (b) bilateral-matching.

DETAILED DESCRIPTION

Figure 1B:
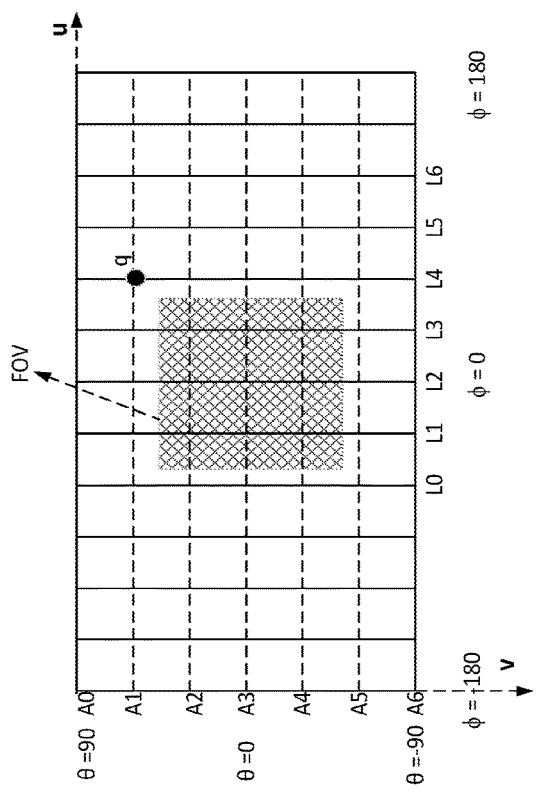
FIGS. 1A-C depict examples of sphere geometry projection to 2D plane using equirectangular projection (ERP).

A detailed description of illustrative embodiments will now be described with reference to the various figures. Although this description provides a detailed example of possible implementations, it should be noted that the details are intended to be exemplary and in no way omit the scope of the application.

Improving the quality of 360-degree video in VR and/or standardizing the processing chain for chairs interoperability may have been focused by one or more groups. For example, an ad hoc group, belonging to MPEG-A (multimedia application format) Part-19, was set up in ISO/IEC/MPEG to work on the requirements and/or technologies for omnidirectional media application format. For example, an ad hoc group, free view TV (FTV), performed exploration experiments for 360-degree 313 video application. FTV tested for 360-degree video (e.g., omnidirectional video) based system and/or multi-view based system. For example, the joint video exploration team (JVET) from MPEG and ITU-T tested sequences including VR for video coding standard. The Joint Exploration Model (JEM), which is designed to enhance the coding efficiency of 2D video beyond the High Efficiency Video Coding (HEVC), may be used for the exploration work of 360-degree video coding. A preliminary Cali for Evidence (CE) is planned to be issued on video compression technologies, where VR and/or 360-degree video may be included as a category of a video source content.

Quality and/or users experience of one or more aspects in the VR processing chain, including capturing, processing, display, and/or applications may be improved. For example, on the capturing side, VR system may use one or more cameras to capture a scene from one or more different views (e.g., 6-12 views). The different views may be stitched together to form 360-degree video in high resolution (e.g., 4K or 8K), For example, on the client or user side, the VR system may include a computation platform, a head mounted display (HMD), and/or a head tracking sensor. The computation platform may receive and/or decode the 360-degree video and may generate a viewport for display. Two pictures, one for each eye, may be rendered for the viewport. The two pictures may be displayed in the HMD for stereo viewing. Lens may be used to magnify the image displayed in the HMD, e.g., for better viewing. The head tracking sensor may keep (e.g., constantly keep) track of the viewers head orientation. The head tracking sensor may feed the orientation information to the system to display the viewport picture for that orientation. A VR system may provide a touch device (e.g., specialized touch device) for the viewer, e.g., to interact with objects in the virtual world. In examples, a VR system may be driven by a workstation with GPU support. In examples, a VR system may use a smartphone as a computation platform, a HMD display, and/or a head tracking sensor. The spatial HMD resolution may be 2160×1200. Refresh rate may be 90 Hz, and the field of view (FOV) may be 110 degree. The sampling rate for head tracking sensor may be 1000 Hz, which may capture fast (e.g., very fast) movement. An example of VR system may use a smartphone as a computation platform and may include of lens and/or cardboard. 360-degree video streaming service may exist.

360-degree video delivery may represent the 360-degree information using a sphere geometry structure. For example, the synchronized one or more views captured by the one or more cameras may be stitched on a sphere as an integral structure. The sphere information may be projected to 2D planar surface with a geometry conversion process. For example, an equirectangular projection (ERP) and/or a cube-map projection (CMP) may be used to illustrate the projection format.

Figure 1A:
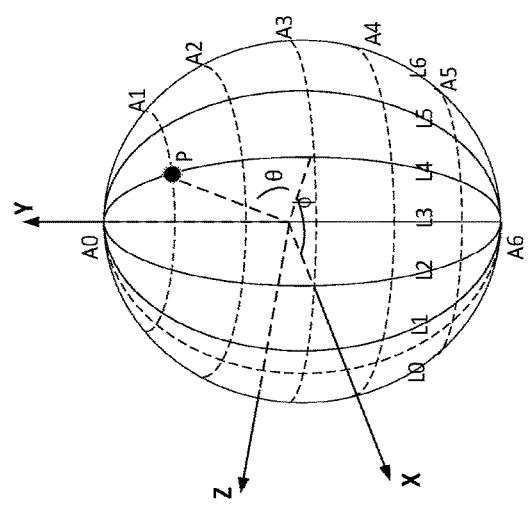
Figure 1C:
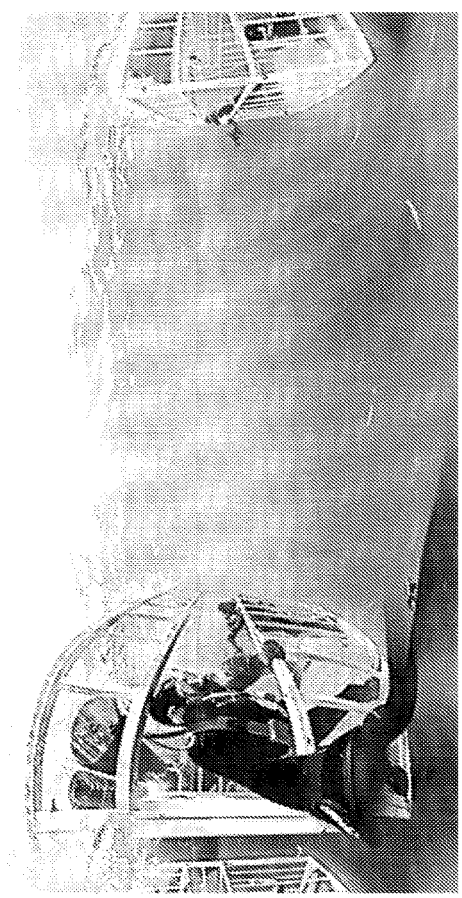

ERP may map the latitude and/or longitude coordinates of a spherical globe onto (e.g., directly onto) horizontal and/or vertical coordinates of a grid. FIG. 1A depicts an example of sphere sampling in longitudes ($\varphi$) and latitudes ($\theta$). FIG. 1B depicts an example of sphere being projected to 2D plane using, for example ERP. FIG. 1C depicts an example of projective picture with ERP. The longitude $\varphi$ in the range ($-\pi$, $\pi$) may be yaw, and latitude $\theta$ in the range $[-\pi/2, \pi/2]$ may be pitch in aviation. $\pi$ may be the ratio of a circle's circumference to its diameter. In FIGS. 1A-B, (x, y, z) may represent a point's coordinates in 3D space, and (ue, ye) may represent the coordinate of a point in 2D plane. ERP may be represented mathematically as shown in Equations 1 and/or 2:

$$ue = (\varphi/2*\pi) + 0.5) * W \quad (1)$$

$$ve = (0.5 - \theta/\pi) * H \quad (2)$$

where W and H may be the width and height of the 2D planar picture. As shown in FIG. 1A, the point P, the cross point between longitude L4 and latitude A1 on the sphere, may be mapped to a point q (e.g., in FIG. 1B) in the 2D plane using Equations 1 and/or 2. The point q in 2D plane may be projected back to the point P on the sphere via, for example inverse projection. The field of view (FOV) in FIG. 1B may show an example that the FOV in sphere may be mapped to 2D plane with the view angle along X axis being about 110 degrees.

As shown in FIG. 1C, the top and/or bottom portions of the ERP picture (e.g., North Pole and/or South Pole, respectively) may be stretched compared to, for example, the middle portion of the picture (e.g., equator). The stretching of the top and/or bottom portions of the ERP picture may indicate that the spherical sampling density may be uneven for ERP format. The motion field, which may describe the temporal correlation among neighboring ERP pictures, may become complicated than 2D video. Video codec, such as MPEG-2, H.264, or HEVC, may use translational model to describe motion field. The video codec may not represent (e.g., not efficiently represent) shape varying movement in planar ERP Ochres. One or more geometric projection formats may be used to map 360-degree video onto multiple faces.

Figure 2A:
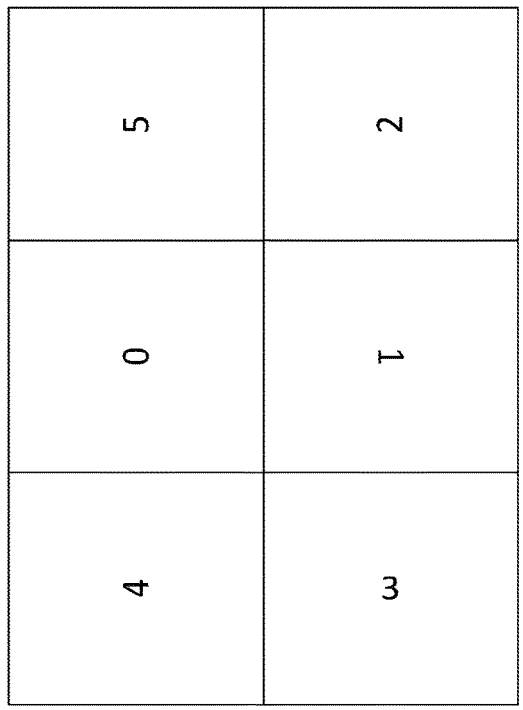
FIGS. 2A-C depict examples of cubemap projection (CMP).
Figure 2B:
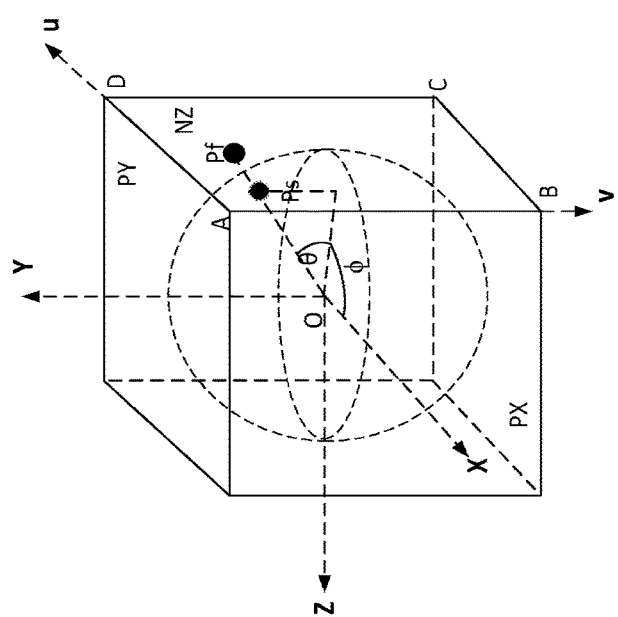
Figure 2C:
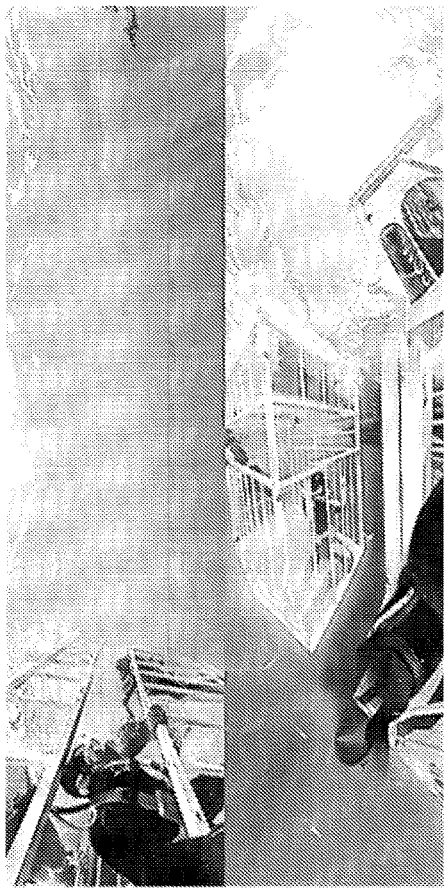

The CMP may be compression friendly format. FIG. 2A depicts an example of 3D geometry structure for CMP. The CMP may include of 6 square faces. The square faces may be labeled as PX, PY, PZ, NX, NY, and/or NZ, where P may stand for positive, N may stand for negative, and X, Y, and Z may refer to the axes. The square faces may be labeled using numbers (e.g., 0-5): PX (0), NX (1), PY (2), NY (3), PZ (4), and/or NZ (5). The radius of the tangent sphere may be set to 1, and the lateral length of one or more fixes may be set to 2. The 6 square faces of CMP format may be packed together into a picture (e.g., single picture) as video codec may not be designed to handle (e.g., directly handle) sphere video. To maximize the continuity between neighboring faces, one or more faces may be rotated by a certain degree. FIG. 2B depicts an example of packing to place 6 faces into a rectangular picture, where one or more face indices are put in the direction that may be aligned with the corresponding rotation of the face. For example, as shown in FIG. 2B, face #3 and face #1 may be rotated counterclockwise by 270 and 180 degrees, respectively. Other faces (e.g., face #0, #2, #4, and/or #5) may not be rotated. FIG. 2C depicts an example of projective picture with CMP.

Figure 3:
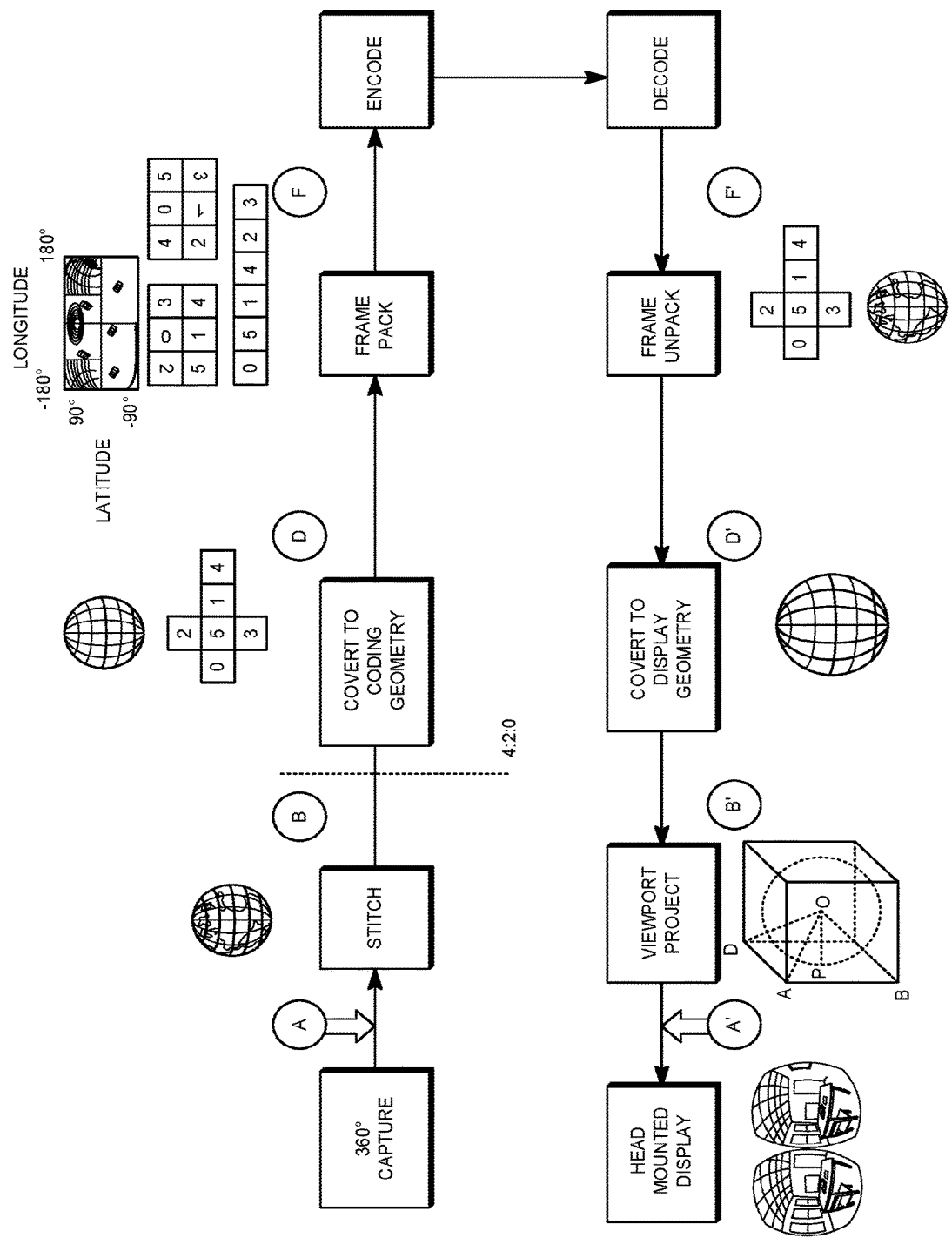
FIG. 3 depicts an example workflow of 360-degree video system.

FIG. 3 depicts an example workflow for 360-degree video system. The workflow may use one or more cameras to capture videos covering the whole sphere. The captured videos may be stitched together in a geometry structure (e.g., native geometry structure), for example an ERP format. The geometry structure may be converted to another geometry structure CMP format or other projection formats) for encoding using the video codecs. At the receiver, the video may be decoded, and the decompressed frame may be converted to the geometry for display. The video may be rendered via viewport projection according to user's viewing angle and may be displayed into HMD.

Figure 4B:
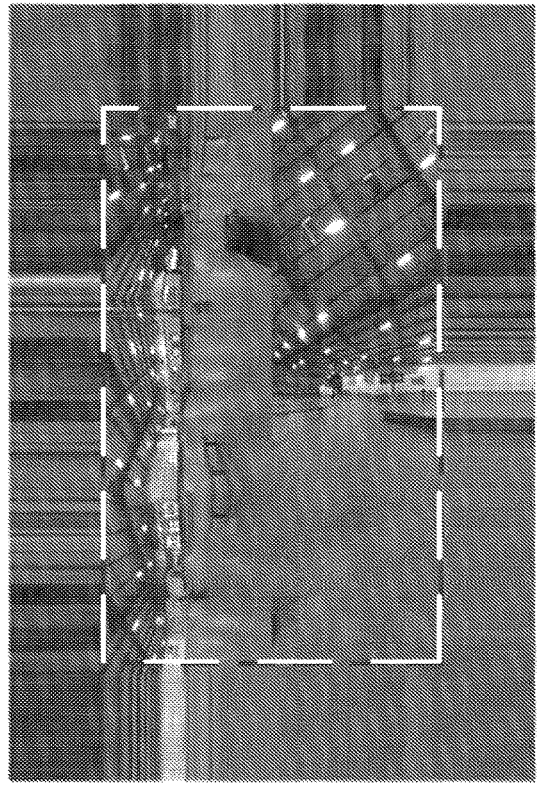
FIGS. 4A and 4B depict examples of extended pictures generated by repetitively padding boundaries using (a) ERP; and (b) CMP.
Figure 4A:
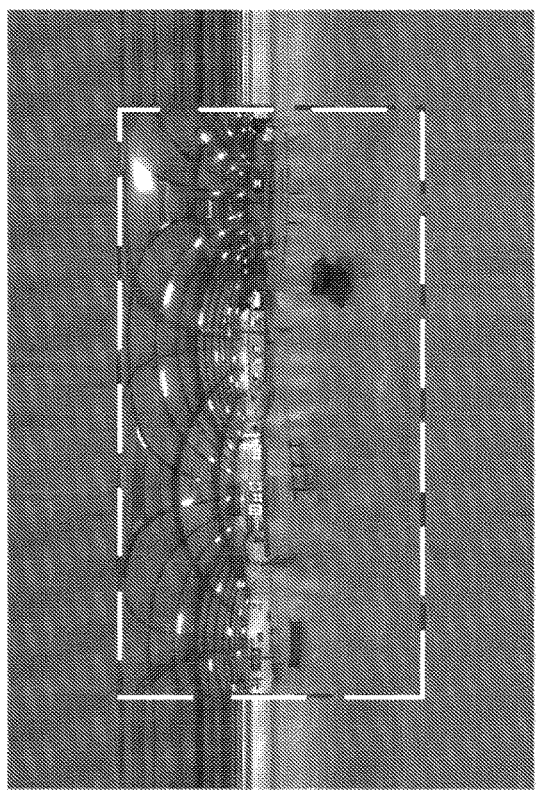

Video codec(s) may be designed considering 2D video captured on a plane. When motion compensated prediction uses samples outside of a reference picture's boundaries, padding may be performed by copying the sample values from the picture boundaries. For example, repetitive padding may be performed by copying the sample values from the picture boundaries. FIGS. 4A and 4B depict examples of extended pictures generated by the repetitive padding for ERP (e.g., FIG. 4A) and CMP (e.g., FIG. 4B). In FIGS. 4A and 4B, the original picture may be within the dotted box, and extended boundary may be outside of the dotted box. The 360-degree video may differ from 2D video. For example, the 360-degree video may include video information on a whole sphere, and the 360-degree video may have a cyclic property. Considering the cyclic property of the 360-degree video, the pictures of the 360-degree video (e.g., project format used for representation may be irrelevant) may not have "boundaries," as the information that the picture of the 360-degree video contain may be wrapped around a sphere. Geometry padding may be used for 360-degree video coding. For example, geometry padding may be used for the 360-degree video coding by padding the samples and/or by considering the 3D geometry structure represented in the 360-degree video. One or more different padding approaches may be used for motion-compensated prediction based on, for example, the promotion format that is applied for coding the 360-degree video.

Geometry padding for ERP may be defined on the sphere with longitude and/or latitude. For example, given a point (u, v) to be padded (e.g., outside of the ERP picture), the point (u', v') used to derive the padding sample may be calculated using one or more Equations 3-5.

$$\text{If } (u<0 \text{ or } u\geq W) \text{ and } (0\leq v<H), u'=u\%W, v'=v \quad (3)$$

$$\text{if } (v<0), v'=-v-1, u'=(u+W/2)\%W; \quad (4)$$

$$\text{if } (v\geq H), v'=2*H-1-v, u'=(u+W/2)\%W \quad (5)$$

where W and H may be the width and height of the ERP picture. FIG. 5A depicts an example of geometry padding process for ERP. In the left and/or right boundary, samples at A, B, C, D, E, and/or F may be padded with the sample at A', B', C', D', E', and/or F', respectively. In the top boundary, samples at G, H, I, and/or J may be padded with the sample at G', H', I', and/or J', respectively. In the bottom boundary, samples at K, L, M, and/or N may be padded with the sample at K', L', M', and/or N', respectively. FIG. 5B depicts an example of the extended ERP picture using geometry padding. The geometry padding in FIG. 5B may provide meaningful samples and/or may improve continuity of neighboring samples for areas outside of the ERP picture boundaries.

Figure 6B:
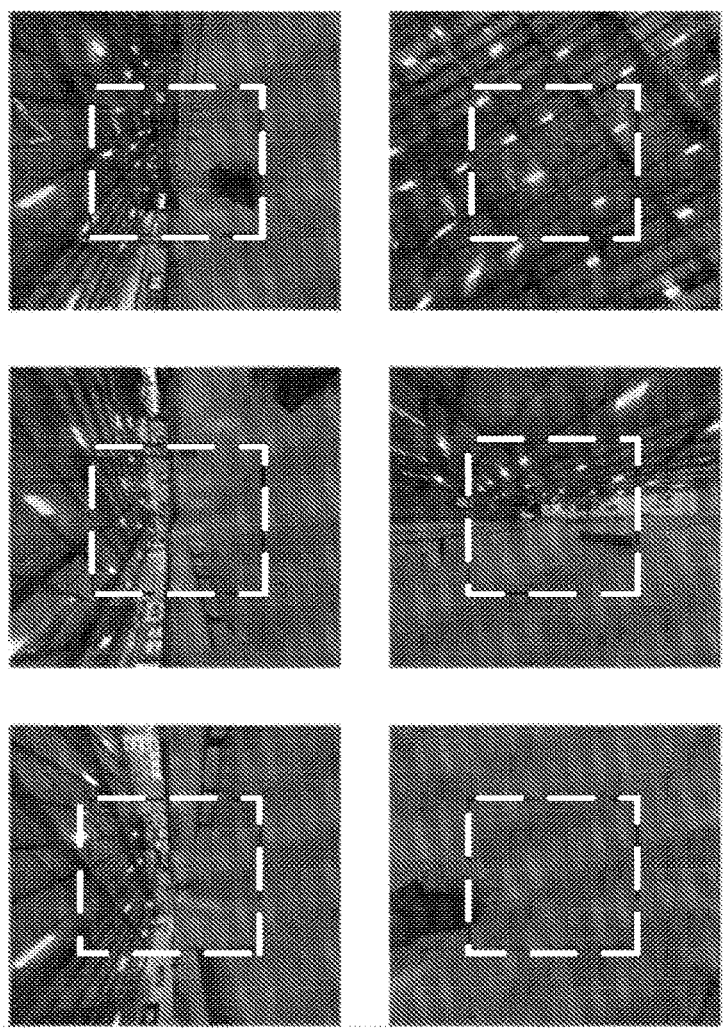
FIGS. 6A and 6B depict examples of geometry padding for CMP.
Figure 6A:
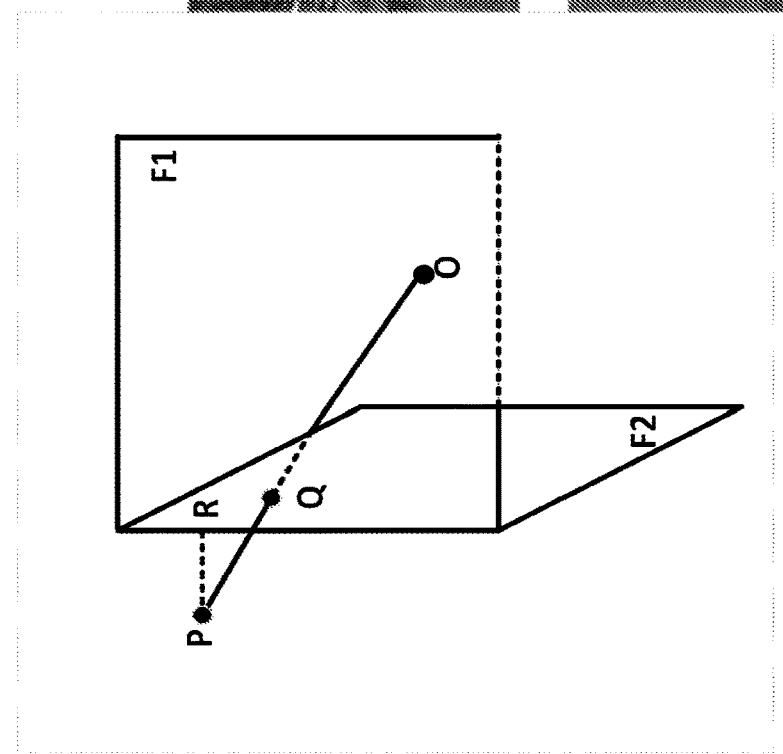

When the projection format is CMP, faces of CMP may be extended by the geometry padding through projecting the samples of the neighboring faces onto the extended area of the current face. FIG. 6A depicts an example of how the geometry padding may be performed for a given CMP face. In FIG. 6A, point P may on face F1, but may be outside of face F1's boundaries. Point O may be the center of the sphere. R may be the left boundary point closest to point P, and R may be inside face F1. Point Q may be the projection point of point P on the neighboring face F2 from the center point O. Geometry paddling may be configured to use the sample value at point Q to fill the sample value at point P and may not use sample value at point R to fill the sample value at point P (e.g., using repetitive padding). FIG. 6B depicts example of the extended six faces by the geometry padding for the CMP format. The geometry padding shown in FIG. 6B may provide meaningful reference samples outside of the face boundaries and/or may improve the efficiency of temporal prediction.

Figure 7:
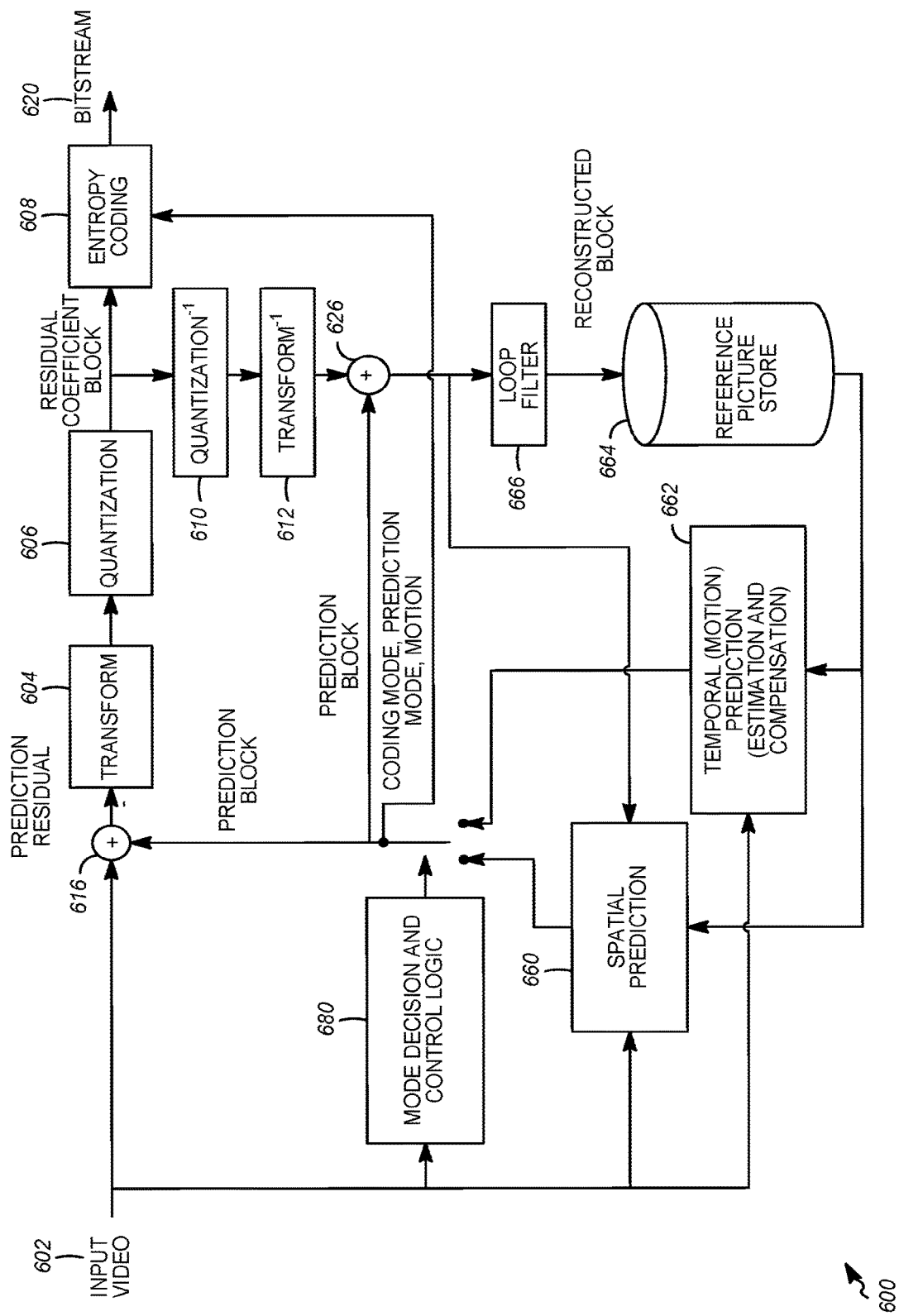
FIG. 7 depicts an example diagram of block-based video encoder.
Figure 8:
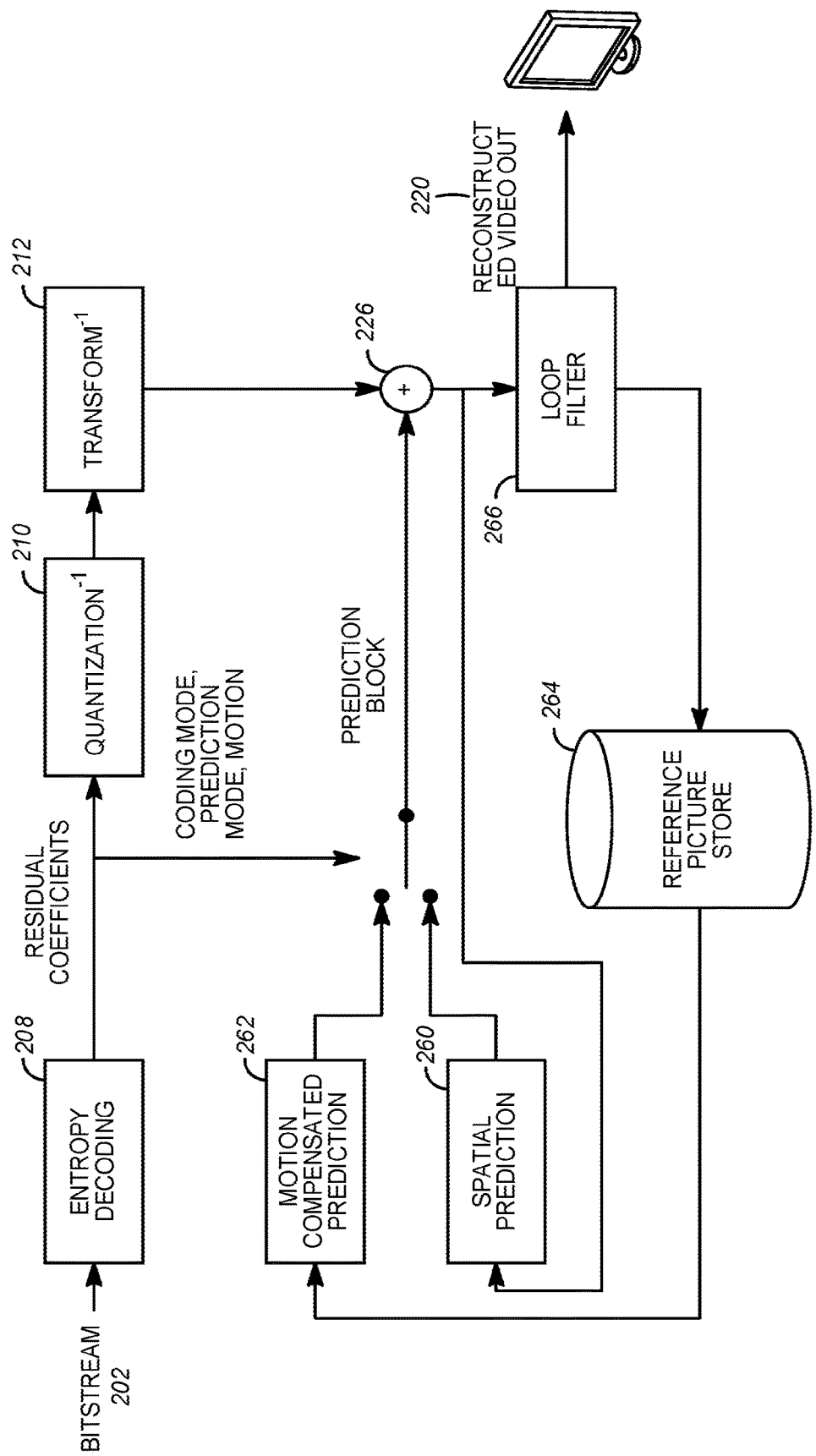
FIG. 8 depicts an example diagram of block-based video decoder.

FIG. 7 depicts an example diagram of encoding process, and FIG. 8 depicts an example diagram of decoding process. Encoding and/or decocting processes may adhere to, for example, the HEVC encoding and/or decoding workflow and may be based on the functional blocks (e.g., same functional blocks) including spatial prediction (e.g., Intra prediction), temporal prediction (e.g., inter prediction), transform, quantization, entropy coding, and/or loop filters. One or more modules associated with inter coding, such as motion-compensated prediction, residual transform, loop filter, and/or entropy coding, may be extended (e.g., further extended).

FIG. 7 illustrates an example block-based hybrid video encoding system 600. The input video signal 602 may be processed block by block. Extended block sizes (e.g., referred to as a coding with or CU) may be used to compress high resolution (e.g., 1080p and/or beyond) video signals. A CU may have up to 64×64 pixels. A CU may be partitioned into prediction wits or PUs, for which separate predictions may be applied. For an input video block (e.g., a macroblock (MB) or CU), spatial prediction 660 or temporal prediction 662 may be performed. Spatial prediction (e.g., intra prediction) may use pixels from already costed neighboring blocks in the sane video picture and/or slice to predict a current video block. Spatial prediction may reduce spatial redundancy inherent in the video signal. Temporal prediction (e.g., referred to as inter prediction or motion compensated prediction) may use pixels from already coded video pictures to predict a current video block. Temporal prediction may reduce temporal redundancy inherent in the video signal. A temporal prediction signal for a given video block may be signaled by a motion vector that indicates the amount and/or direction of motion between the current block and its reference block. If multiple reference pictures are supported, the reference picture index of a video block may be signaled to a decoder. The reference index may be used to identify from which reference picture in a reference picture store 664 the temporal prediction signal may come.

After spatial and/or temporal prediction, a mode decision 680 in the encoder may select a prediction mode, for example based on a rate-distortion optimization. The prediction block may be subtracted from the current video block at 616. Prediction residuals may be de-correlated using a transform module 604 and a quantization module 606 to achieve a target bit-rate. The quantized residual coefficients may be inverse quantized at 610 and inverse transformed at 612 to form reconstructed residuals. The reconstructed residuals may be added back to the prediction block at 626 to form a reconstructed video block. An in-loop filter such as a de-blocking filter and/or an adaptive loop filter may be applied to the reconstructed video block at 666 before it is put in the reference picture store 664. Reference pictures in the reference picture store 664 may be used to code future video blocks. An output video bit-stream 620 may be formed. Coding mode (e.g., inter or infra coding mode), prediction mode information, motion information, and/or quantized residual coefficients may be sent to an entropy coding unit 608 to be compressed and packed to form the bit-stream 620.

FIG. 8 illustrates an example block-based hybrid video decoder. The decoder in FIG. 8 may correspond to the encoder in FIG. 7. A video bit-stream 202 may be received, unpacked, and/or entropy decoded at an entropy decoding unit 208. Coding mode and/or prediction information may be sent to a spatial prediction unit 260 (e.g., if intra coded) and/or to a temporal prediction unit 262 (e.g., if inter coded). A prediction block may be formed the spatial prediction unit 260 and/or temporal prediction unit 262. Residual transform coefficients may be sent to an inverse quantization unit 210 and an inverse transform unit 212 to reconstruct a residual block. The prediction block and residual block may be added at 226. The reconstructed block may go through in-loop filtering 266 and may be stored in a reference picture store 264. Reconstructed videos in the reference picture store 264 may be used to drive a display device and/or to predict future video blocks.

A video block may have a motion vector (e.g., at most a motion vector) for a prediction direction. Sub-block level motion vector predictions may be applied, A block (e.g., large block) may be split into multiple sub-blocks (e.g., multiple small sub-blocks). Motion information for one or more (e.g., all) the sub-blocks may be derived. Advanced Moral motion vector prediction (ATMVP) may build upon the temporal motion vector prediction (TMVP). ATMVP may allow a coding block to fetch the motion information of its sub-blocks from multiple small blocks from its temporal neighboring picture (e.g., collocated reference picture). Spatial-temporal motion vector prediction (STMVP) may derive (e.g., recursively derive) the motion information of the sub-blocks, e.g., by averaging the motion vectors of temporal neighbors with that of the spatial neighbors.

Figure 9:
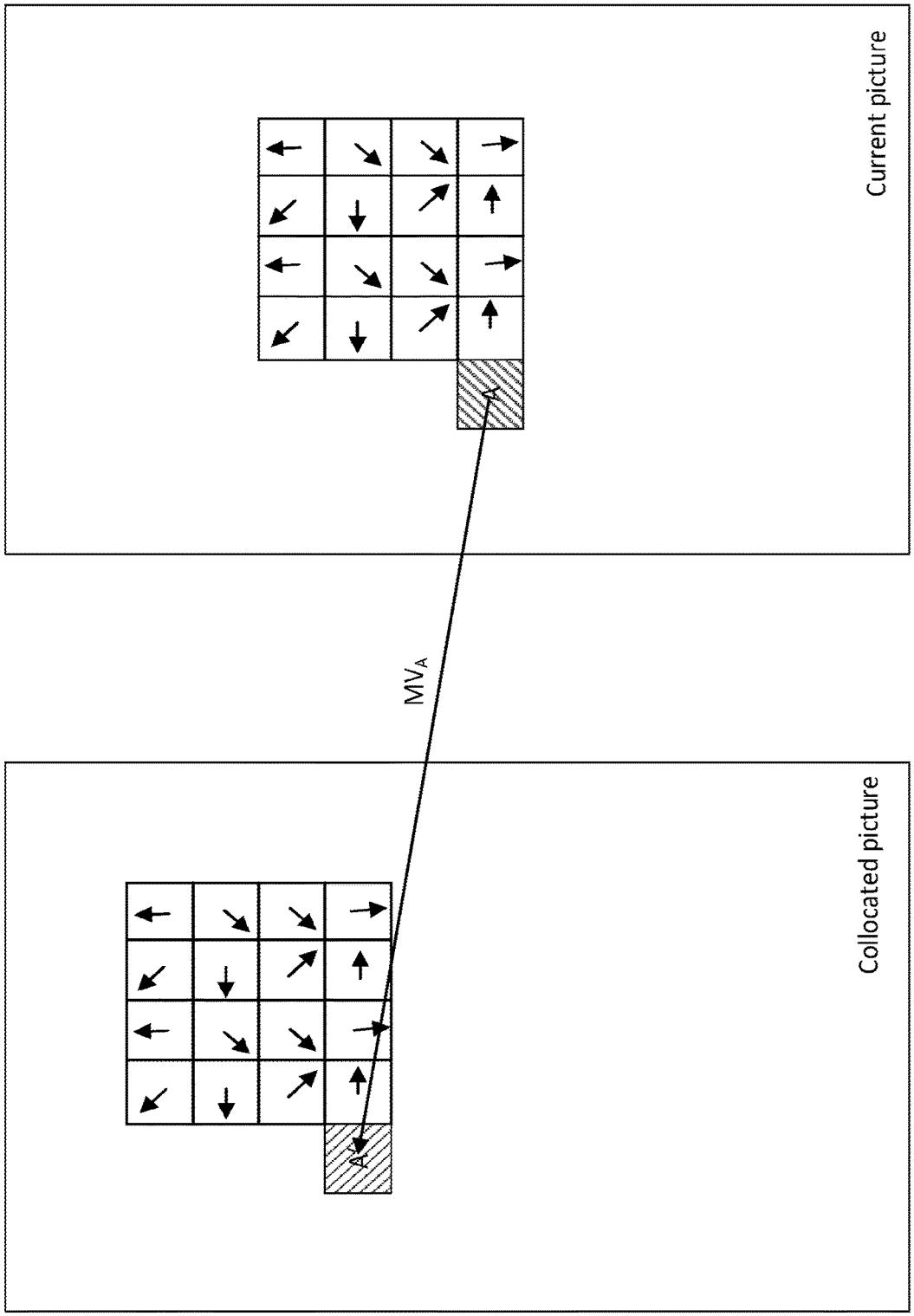
FIG. 9 depicts an example advanced temporal motion vector prediction (ATMVP).

In ATMVP, the TMVP may allow a block to derive multiple motion information (e.g., inducting motion vector and/or reference indices) for the sub-blocks in the block from one or more (e.g., multiple) smaller blocks of the temporal neighboring pictures of the current picture. The ATMVP may derive the motion information of sub-blocks of a block as described herein. The ATMVP may identify the corresponding block of the current block (e.g., which may be called collocated block) in a temporal reference picture. The selected temporal reference picture may be called the collocated picture. The ATMVP may split the current block into one or more sub-blocks and may derive the motion information of the sub-blocks (e.g., each of the sub-blocks) from the corresponding small blocks in the collocated picture, as shown in FIG. 9.

The collocated block and/or the collocated picture may be identified by the motion information of the spatial neighboring blocks of the current block. In ATMVP design, the available (e.g., first available) candidate in the merge candidate list may be considered. FIG. 9 depicts an example of ATMVP. For example, FIG. 9 may assume that block A is identified as the first available merge candidate of the current block, e.g., based on the scanning order of merge candidate list. The corresponding motion vector of block A (e.g., $MV_A$) and its reference index may be used to identify the collocated picture and/or the collocated block. The location of the collocated block in the collocated picture may be determined by adding the motion vector of block A (e.g., $MV_A$) to the coordinate of the current block.

For sub-blocks in the current blocs, the motion information of the corresponding small block (e.g., as indicated by arrows in FIG. 9) in the collocated block may be used to derive the motion information of the corresponding sub-block in the current block. After the motion information of the small blocks in the collocated block is identified, the small blocks in the collated block may be converted to the motion vector and/or reference index of the corresponding sub-block in the current block in, for example, the TMVP in HEVC where temporal motion vector scaling may be applied.

Figure 10:
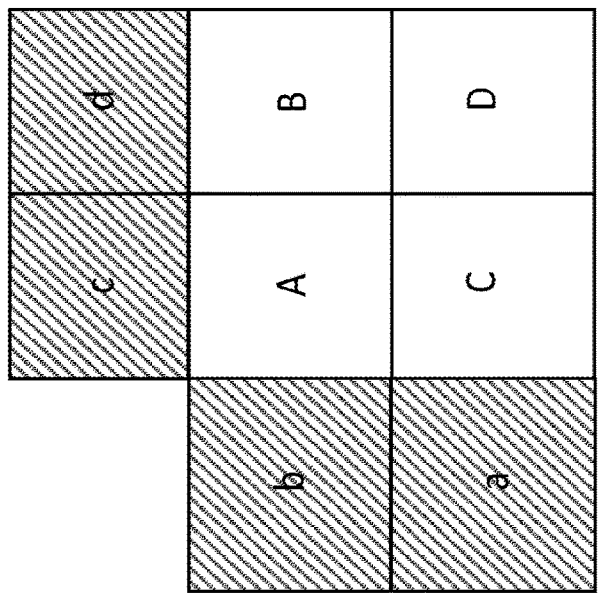
FIG. 10 depict an example spatial-temporal motion vector prediction (STMVP).

In STMVP, the motion information of the sub-blocks in a coding block may be derived in, for example a recursive manner. FIG. 10 depicts an example of STMVP. FIG. 10 may assume that the current block may include one or more sub-blocks (e.g., four sub-blocks), such as 'A', 'B', 'C', and/or 'D'. The neighboring small blocks that are spatial neighbors to the current block may be labeled as 'a', 'b', 'c', and/or 'd', respectively. The motion derivation for sub-block 'A' may identify the spatial neighbors (e.g., two spatial neighbors). For example, a neighbor of sub-block 'A' may be the above neighbor 'c'. If the small block 'c' is not available or is not intra coded, the following neighboring small blocks above the current block (e.g., from left to right) may be checked in the order. Other neighbor of sub-block 'A' may be the left neighbor 'b'. If the small block 'b' is not available or not intra coded, the following neighboring small blocks to the left of the current block (e.g., from top to bottom) may be checked in the order. After fetching the motion information of spatial neighbors, the motion information of temporal neighbor of sub-block 'A' may be determined by, for example TMVP process in HEVC. Some or all the motion information of the available spatial and/or temporal neighbors (e.g., up to 3) may be averaged and/or may be used as the motion information of sub-block 'A'. Based on the raster scan order, the STMVP process may be repeated to derive the motion information of some or all the other sub-blocks in the current video block.

Figure 11:
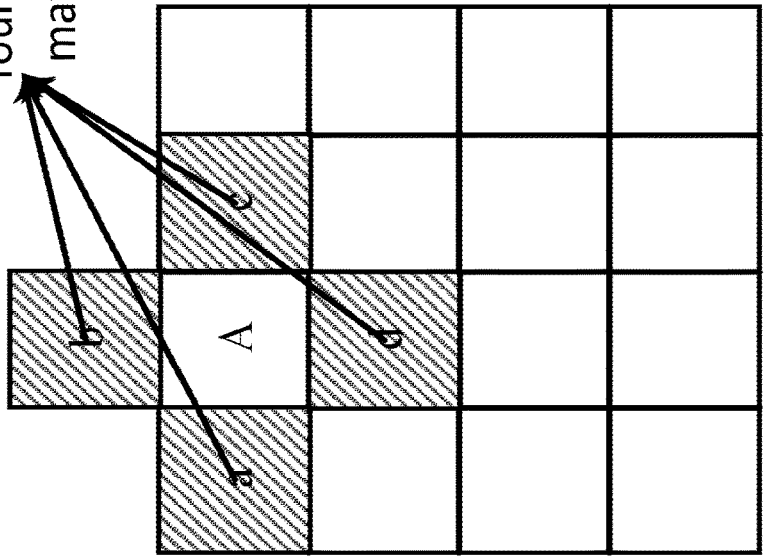
FIG. 11 depicts an example overlapped block motion compensation (OBMC).

The overlapped block motion compensation (OBMC) may be used to remove the blocking artifact at motion compensation stage. The OBMC may be performed for one or more (e.g., all) inter block boundaries except for example, the right and/or bottom boundaries of a block. When a video block is coded in a sub-block mode (e.g., ATMVP and/or STMVP), the OBMC may be performed for sub-block's boundaries. FIG. 11 depicts an example of OBMC. For example, when the OBMC is applied to a sub-block (e.g., the sub-block 'A' in FIG. 11), in addition to the motion vector of the current sub-block, motion vectors of neighboring sub-blocks (e.g., up to four) may be used to derive the prediction signal of the current sub-block. The one or more prediction blocks using the motion vectors of neighboring sub-blocks may be averaged to generate the prediction signal (e.g., final prediction signal) of the currant sub-block.

Weighted average may be used in OBMC to generate the prediction signal of a block. The prediction signal using the motion vector of a neighboring sub-block may be denoted as PN. The prediction signal using the motion vector of the current sub-block may be denoted as PC. When the OBMC is applied, the samples in the first and/or last four rows and/or columns of PN may be weighted averaged with the samples at the same positions in PC. The samples to which the weighted averaging is applied may be determined according to, for example, the location of the corresponding neighboring sub-block. For example, when the neighboring sub-block is above neighbor (e.g., sub-block 'b' in FIG. 11), the samples in the first four rows of the current sub-block may be adjusted. When the neighboring sub-block is below neighbor (e.g., sub-block 'd' in FIG. 11), the samples in the last four rows of the current sub-block may be adjusted. When the neighboring sub-block is left neighbor (e.g., sub-block 'a' in FIG. 11), the samples in the first four columns of the current block may be adjusted. When the neighboring sub-block is right neighbor (e.g., sub-block 'c' in FIG. 11), the samples in the last four columns of the current sub-block may be adjusted. When the current block is not coded in a sub-block mode, weighting factors {¼, ⅛, 1/16, 1/32} may be used for the first bur rows and/or columns of PN, and weighting factors {¾, ⅞, 15/16, 31/32} may be used for the first four rows and/or columns of PC. When the current block is coded in sub-block mode, the first two rows and/or columns of PN and PC may be averaged. Weighting factors {¼, ⅛} may be used for PN, and weighting factors {¾, ⅞} may be used for PC.

In HEVC, one or more (e.g., all) inter prediction parameters (e.g., motion vectors, reference index, and/or weighted prediction parameters) may be determined at an encoder by rate-distortion (R-D) optimization and may be signaled to a decoder. Coding inter prediction parameters may account for an overhead (e.g., significant overhead). Signaling overhead may be avoided, for example, by using template-based costing in JEM. The template-based coding may derive the inter prediction parameters at decoder using the templates that may be already reconstructed neighboring samples of the current block. Local illumination compensation (IC) may derive local weighting parameters based on, for example, a linear model using the template and/or may apply weighted motion compensated prediction using, for example, the derived weighting parameters. Frame-rate up conversion (FRUC) may derive motion information at decoder using template matching or bilateral matching.

Figure 12:
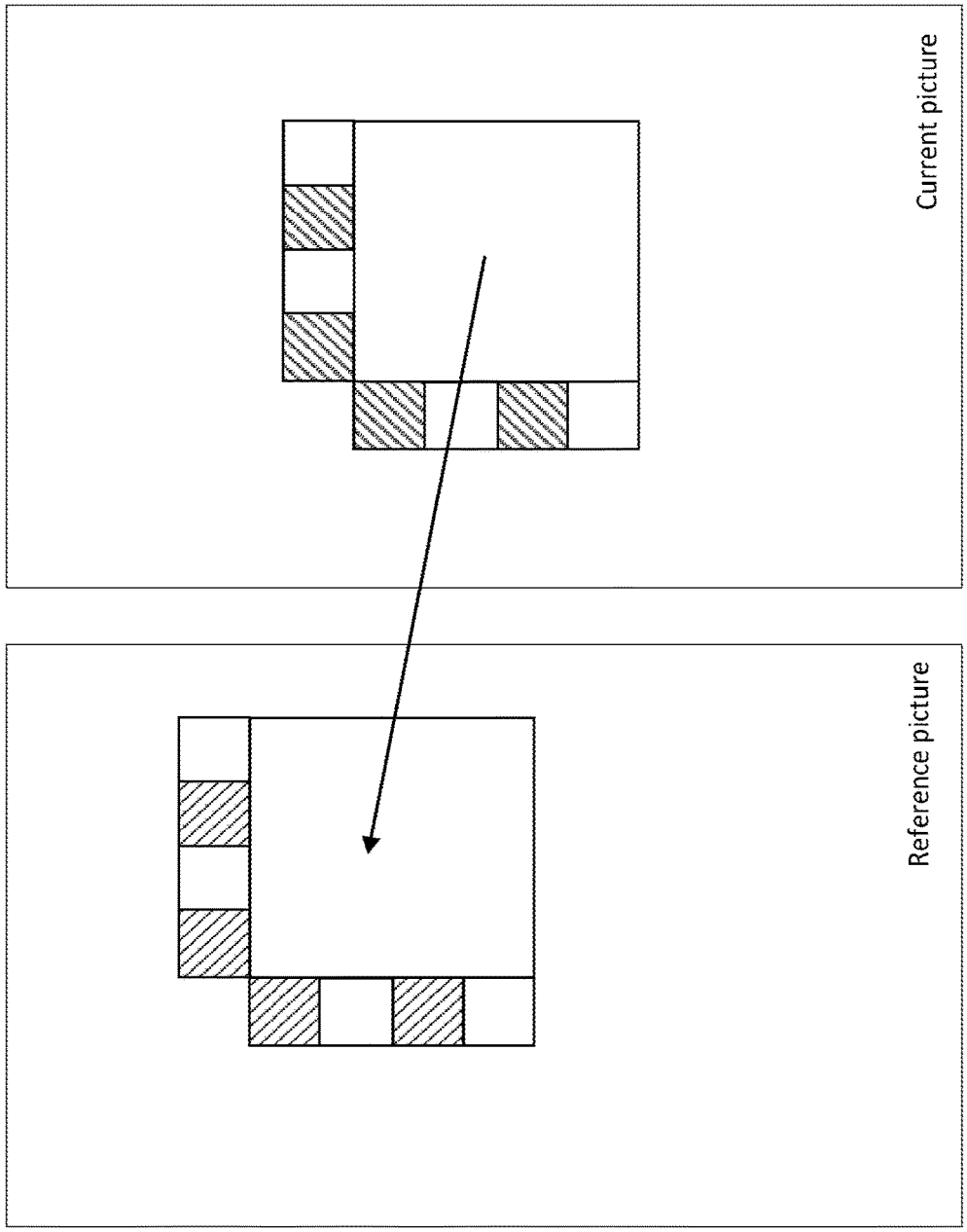
FIG. 12 depicts an example local illumination compensation (IC).

IC may be based on a linear motet for illumination changes, using a scaling factor 'a' and/or an offset. The tool may be enabled and/or disabled adaptively for one or more inter coded blocks. FIG. 12 depicts an example of local IC process. In FIG. 12, when IC is applied for a block, a least mean square error (LMSE) may be employed to derive the parameters 'a' and 'b' by minimizing the distortion between the neighboring samples of the current block (e.g., the template) and their corresponding reference samples in the temporal reference picture. As illustrated in FIG. 12, the template may be subsampled (e.g., 2:1 subsampling). For example, the shaded samples in FIG. 12 may be used to derive 'a' and 'b'. Based on the derived scaling factor 'a' and offset 'b', the prediction samples of the current block may be adjusted, e.g., based on the lima mode as follows:

$$P(x,y) = a \cdot P_r(x+v_x, y+v_y) + b$$

where P(x, y) may be the prediction signal of the current block at the coordinate (x, y), and $P_r(x+v_x, y+v_y)$ may be the reference block pointed by the motion vector $(v_x, v_y)$.

FRUC mode may be supported for inter coded blocks (e.g., to save the overhead of signaling motion information). When FRUC mode is enabled, motion information (e.g., including motion vectors and/or reference indices) of the block may not be signaled. The motion information may be derived at a decoder side by, for example, template-matching or bilateral-matching. During the motion derivation process at the decoder, the merge candidate list of the block and/or a set of preliminary motion vectors generated using ATMVP-like prediction for the block may be checked (e.g., firstly checked). The candidate which may lead to the minimum sum of absolute difference (SAD) may be selected as a starting point A local search based on template-matching or bilateral-matching around the starting point may be performed and/or the motion vector (MV) that results in the minimum SAD may be taken as the MV for the whole block. The motion information may be refined (e.g., further refined), e.g., at sub-block level.

Figure 13A:
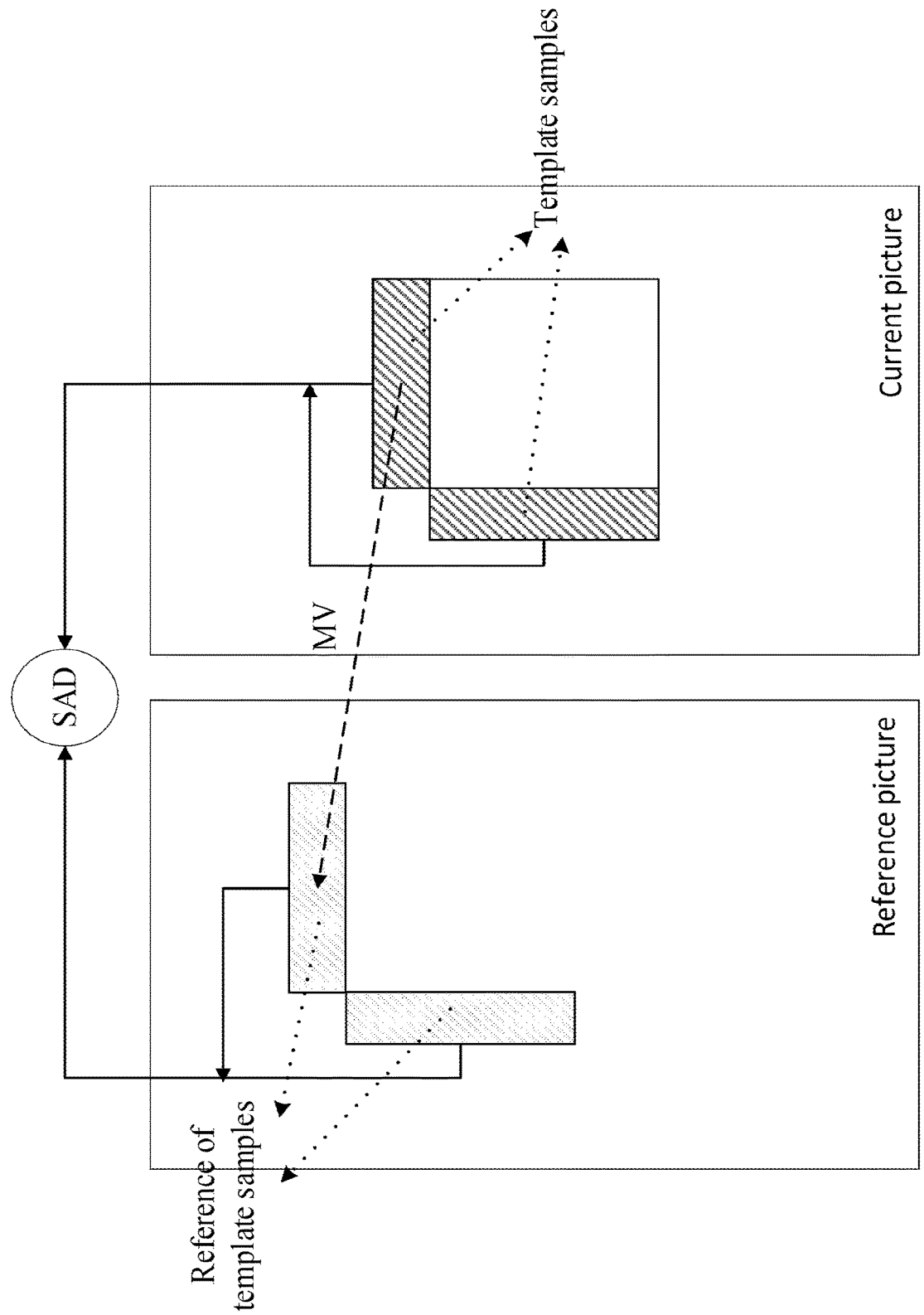
Figure 13B:
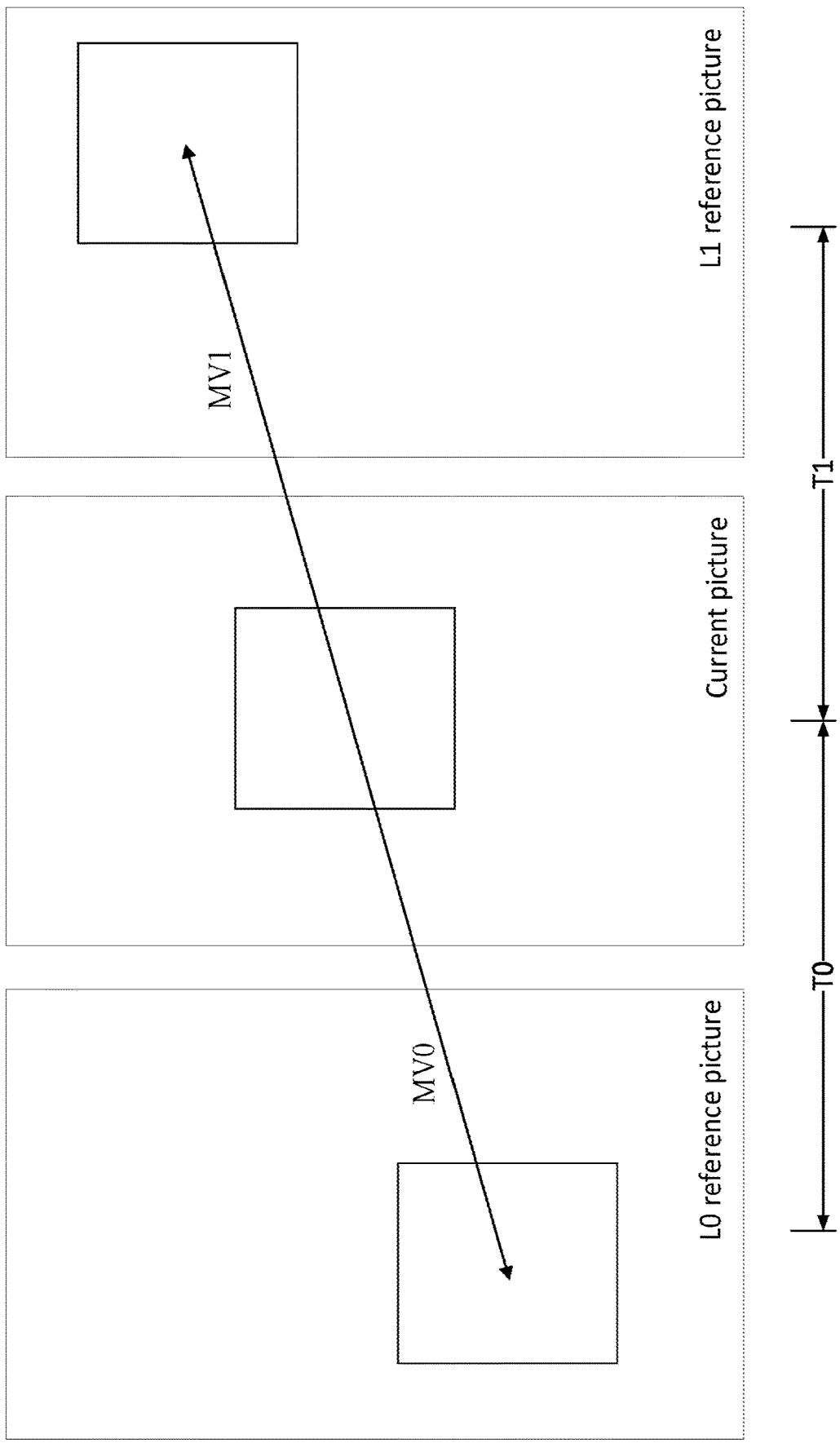

FIGS. 13A-B depict examples FRUC process. As shown in FIG. 13A, template-matching may be used to derive motion information of the current block by finding the match (e.g., best match) between a template (e.g., top and/or left neighboring blocks of the errant block) in the current picture and a block (e.g., same size as the template) in a reference picture. In FIG. 13B, bilateral-matching may be used to derive motion information of the current block by finding the match (e.g., best match) between two blocks along the motion trajectory of the current block in two different reference pictures. The motion search process of the bilateral-matching may be based on motion trajectory. For example, the motion vectors MV0 and MV1 pointing to the two reference blocks may be proportional to the temporal distances between the current picture and one or more of the two reference pictures (e.g., T0 and T1).

Figure 14:
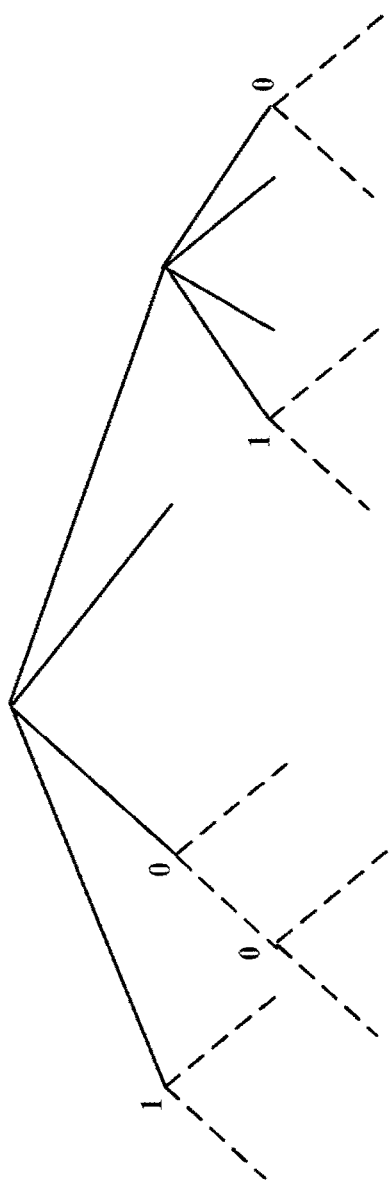
FIG. 14 depicts an example quad-tree plus binary-tree (QTBT) block partitioning.
Figure 14:
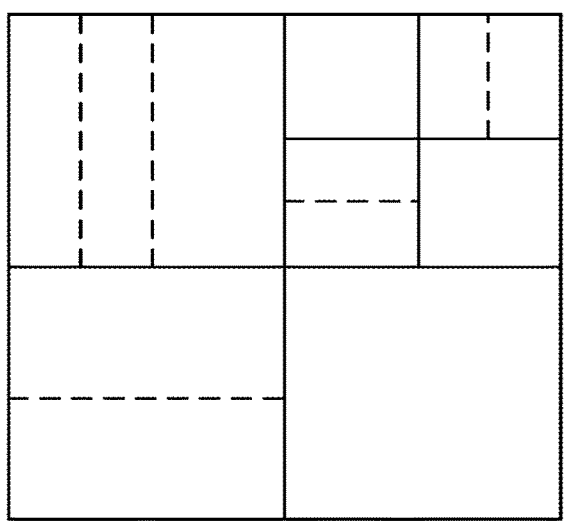

Quad-tree plus binary-tree (QTBT) bock partitioning structure may be applied. In the QTBT structure, a coding tree unit (CTU), which is a root node of quad-tree, may be partitioned (e.g., firstly partitioned) in the quad-tree manner, where the quad-tree splitting of a node may be iterated until the node reaches the minimum of the allowed quad-tree size (MinQTSize). If the quad-tree node size is no larger than the maximum of the allowed binary tree size (MaxBTSize), the quad-tree node may be partitioned (e.g., further partitioned) using binary tree in horizontal or vertical direction. The splitting of the binary tree may be iterated until the binary tree node reaches the minimum of the allowed binary tree node size (MinBTSize) or the maximum of the allowed binary tree depth. The binary tree node may be used as the basic unit of prediction and/or transform without further partitioning (e.g., the concepts of prediction unit (PU) and/or transform unit (TU) in HEVC test model (HM) may not exist). An example of QTBT partitioning structure may be described herein. The CTU size may be 128×128, MinQTSize may be 16×16, MaxBTSize may be 64×64, and MinBTSize may be 4. The quad-tree partitioning may be applied (e.g., firstly applied) to the CTU to generate quad-tree leaf nodes. The quad-tree leaf node size may range from, for example 128×128 to 16×16. If the quad-tree node is 128×128, the quad-tree node may not be split by the binary tree as quad-tree node exceeds the maximum binary tree size (e.g., MaxBTSize may be 64×64). If the quad-tree node is not 128×128, the quad-tree node may be partitioned (e.g., further partitioned) by the binary tree. The quad-tree node may be the root node of the binary tree. The binary tree depth may be equal to 0. The binary tree partitioning may be iterated until the binary tree depth reaches MaxBTDepth or the binary tree node has width or height equal to MinBTSize. FIG. 14 depicts an example of QTBT block partitioning, where the solid lines may represent quad-tree splitting and the dotted lines may represent binary tree splitting.

Video codec(s) may consider (e.g., only consider) 2D video signals that may be captured on the same plane. When considering 360-degree video (e.g., which may include of one or more projection faces), continuity between faces may be broken because one or more faces are generated based on, for example a different projection plane. The discontinuity between faces may be increased for various frame-packing. For motion compensated prediction of 360-degree video coding, geometry padding may be applied. Geometry padding may provide a temporal reference for picture areas that may be outside face boundaries, Motion compensated prediction for 360-degree video using geometry padding may be performed.

Template-based coding (e.g., IC and/or FRUC) may be used to derive inter prediction parameters (e.g., weight and/or offset for IC, and/or motion information for FRUC) using the reconstructed samples from the neighboring region. When geometry padding Is applied (e.g., applied jointly) with template-based coding, complication may arise. In geometry padding, the faces in the reference pictures may be padded, and the faces in the current picture that is being coded may not be padded. When template-based coding is used, if the current block is located at face boundary, the template used by IC and/or FRUC may be outside of the current face. If geometry padding is used as an example, the template of the current block may be from a neighboring face or from outside of the current picture.

Figure 15:
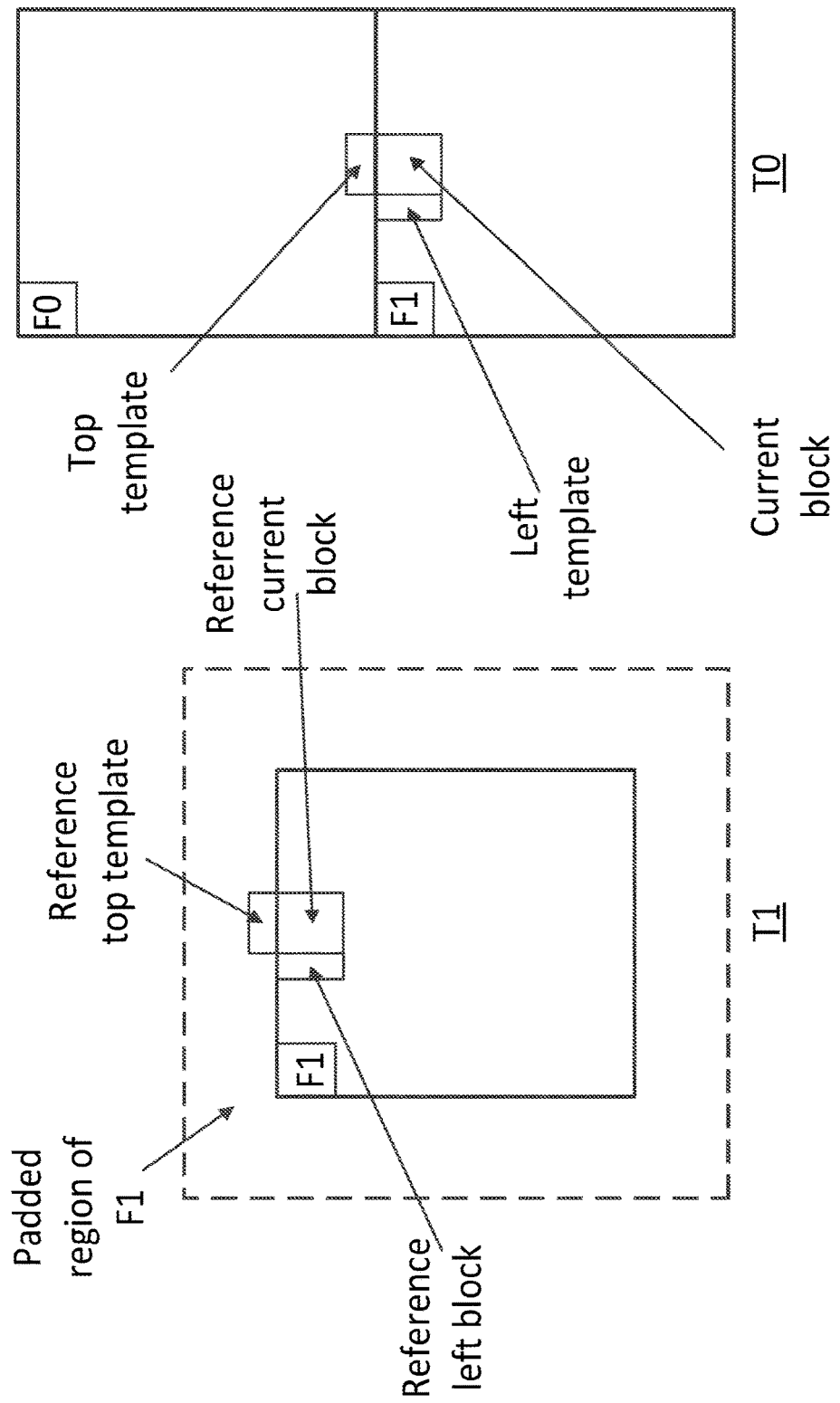
FIG. 15 depicts an example template-based coding when geometry padding is applied for 360-degree video coding.

The reference of the template in the reference picture may be in the padded region of the current face in the reference picture. The template and the reference of the template may be mismatched (e.g., poorly matched) with each other. FIG. 15 depicts an example of template-coding when geometry padding is applied for 360-degree video coding. In FIG. 15, the current block (e.g., at time T0) may be located at the top boundary of face F1. The top template of the current block may be located in face F0 (e.g., in different face). Due to geometry padding, the reference of the top template of the reference block (e.g., at time T1) may be obtained from the padded region of face F1. The samples in the top template and the samples in the reference of the top template may not have strong correlation.

The motion information of spatial and/or temporal neighboring blocks may use one or more inter coding tools to predict the motion information of the current block (e.g., advanced motion vector prediction (AMVP), TMVP, merge mode, ATMVP and/or STMVP) or to generate the prediction signal of the current block (e.g., OBMC). If the current block is located on face boundaries, the current block's spatial and/or temporal neighbors may be fetched from the other faces. A motion vector defined within a face may be used to predict the motion vector or generate the prediction signal of a block that is defined in another face. One or more faces of a 360-degree video may be rotated, flipped, and/or disordered during frame-packing process. The motion vectors from different faces may not have strong correlation.

When the geometry padding is enabled, the reference samples of the current block may be from (e.g., always from) the padded region of the current face. The geometry padding may ensure that a reference block, which may be correlated (e.g., highly correlated) with the current block, may be identified in the padded region to predict the current block because of the intrinsic symmetry characteristic of 360-degree video. When the QTBT partitioning structure is applied (e.g., directly applied) to 360-degree video coding, a quad-hiss/binary-tree (QT/BT) leaf node in the current picture may span one or more faces and may include the samples from one or more faces (e.g., the face boundaries may lie inside the QT/BT leaf node). Neighboring faces (e.g., two neighboring faces) in a frame-packed picture may no longer be contiguous in the 3D space. The samples around the neighboring faces (e.g., two neighboring faces) boundaries may show different characteristics (e.g., belonging to different objects). The padded region of the current face in the reference pictures may not be able to provide a reference block having a strong correlation with the current block.

Motion compensated prediction for 360-degree video based on geometry padding may be performed. The reference sample derivation process for template-based coding may fetch the template samples. For example, the reference sample derivation process for template-based coding may fetch the template serrates from the above and/or the left neighbors. The template samples (e.g., from the above and/or left neighbors) may be from different faces and/or may include discontinuous information. An example of different process for template-based coding may consider the 3D geometry when deriving the template samples that may be beyond the region of the current face.

Geometry-based reference block derivation and/or geometry-based motion vector projection may be used for motion prediction for 360-degree video coding. The geometric characteristics of 360-degree video may be considered.

QTBT block partitioning may partition the blocks at the face boundaries of a frame-packed 360-degree video with the consideration of the impact of the geometry padding (e.g., disabling crossing-face QT/BT leaf node).

If a video block is located on face boundaries and is coded using template-based coding (e.g., IC and/or FRUC), one or more template samples of the video block may be obtained from above and/or left neighbors that are from another face, while the reference samples of the template may be obtained from the padded region of the current face in temporal picture (e.g., FIG. 15). Misalignment may occur.

Figure 16B:
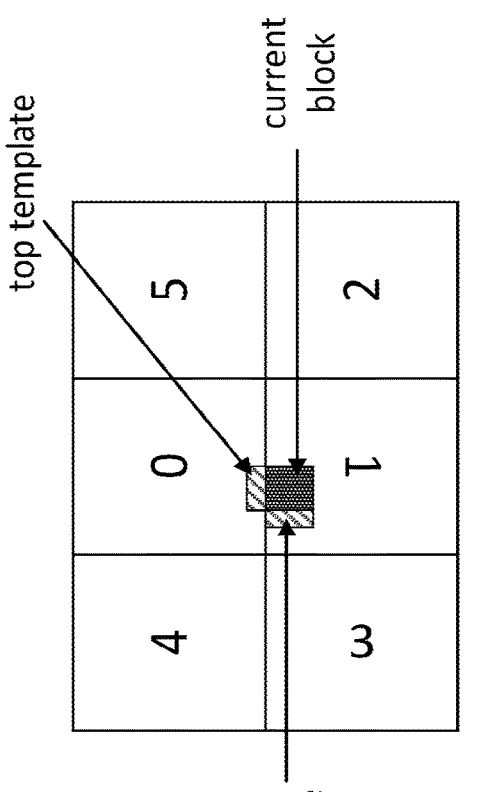
FIGS. 16A-C depict examples of different reference sample derivation for template-based coding in (a) 3D geometry; (b) direct left and/or above neighbors; and (c) geometry-based template derivation.
Figure 16A:
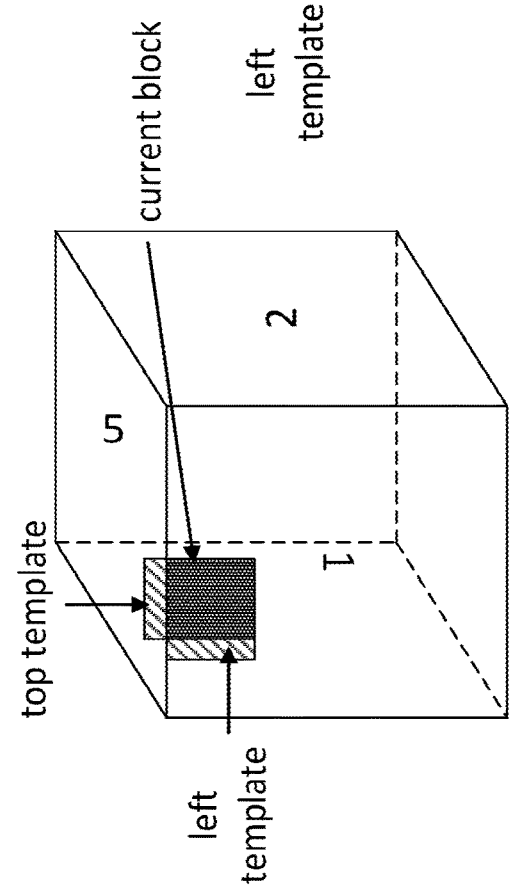
Figure 16C:
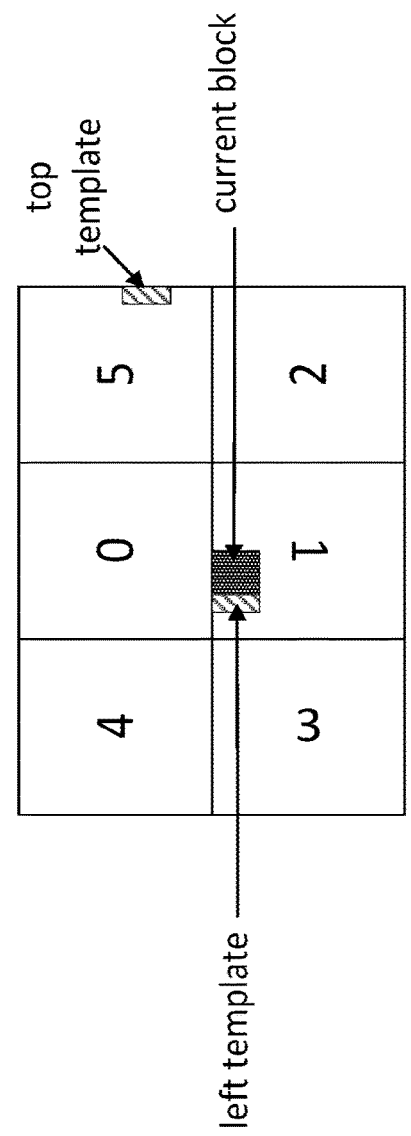

The template samples may be fetched based on the 3D geometry of 360-degree video. For example, if the current block of the current picture is on the face boundary, the template samples may be located outside the boundaries of the current face. If the current block of the current picture is on the face boundary, 3D geometry information may be applied when deriving the template samples of the current block. Using the 3D geometry information to derive the template samples of the current block may provide template samples that may be correlated (e.g., more correlated) with the current block. Using the CMP as example, FIGS. 16A-C depict examples of different reference sample derivation for template-based coding. For example, FIG. 16A depicts an example relationship between the location of the current block and that of its template samples in 3D space. FIG. 16B depicts an example of sample derivation based on left and/or above neighbors (directly left and/or above neighbors), FIG. 16C depicts an example of derivation based on 3D geometry information. In FIGS. 16A-C, the current block may be located at the top boundary of face #1. The samples of the left template may be derived from the reconstructed samples of the neighboring block which may be in the same face of the current block, as shown in FIGS. 16B and 16C. To derive the top template, the samples from face #5 (e.g., which may be derived based on geometry projection) may be used, as shown in FIG. 16C, Face #1 and face #5 may be neighboring faces according to the 3D geometry (e.g., as shown in FIG. 16A). Using geometry information (e.g., 3D geometry information) to derive the template samples may provide template samples that may show correlation (e.g., better correlation) with the current block. When geometry information is used, the samples of the template may be derived from the samples that are decoded (e.g., already deeded) in the current picture. When geometry information is used and if the current picture includes one or more slices and/or Wes, the template samples derived using geometry information may not be available if the template samples are not in the same slice and/or tile as the current block. The template samples may be regarded as unavailable because the slices and/or ties may be decoded (e.g., decoded independently).

The template reference samples of the current block may be derived, e.g., from the geometric neighbors based on 3D geometry information. Using geometry information (e.g., 3D geometry information) may maximize the correlation between the samples of the template and the current block. When using geometry information, the decoder may maintain (e.g., temporarily maintain) the samples of previously reconstructed faces. To reduce the line buffer size, template samples may be disabled (e.g., may be regarded as unavailable) if the template samples are outside the boundaries of the current face. For example, when the current block is on a face boundary, template-based coding tools may be disabled. Disabling template-based coding tools may reduce line buffer size with limited performance impact, as the number of blocks on face boundaries may be small. As shown in FIGS. 16A-C, depending on the frame-packing used, some neighboring faces in the frame-packed layout may be contiguous based on the 3D geometry. For example, face #4 and face #5 and/or We #3 and face #1 may be neighboring in the frame-packed format and/or neighboring in the 3D space. The samples derived from the spatial neighbor may provide a candidate (e.g., good candidate) for template-based coding. Template samples may be disabled if the template samples are from a neighboring face that may not geometrically neighboring to the current face. For example, if a template is from the current face or from a geometrically neighboring face, the template may be regarded as valid (e.g., available) for template-based coding. The template-based coding described herein may need less line buffers as the samples of the left CTU and/or the samples of the above CTU row may not be cached.

Figure 17:
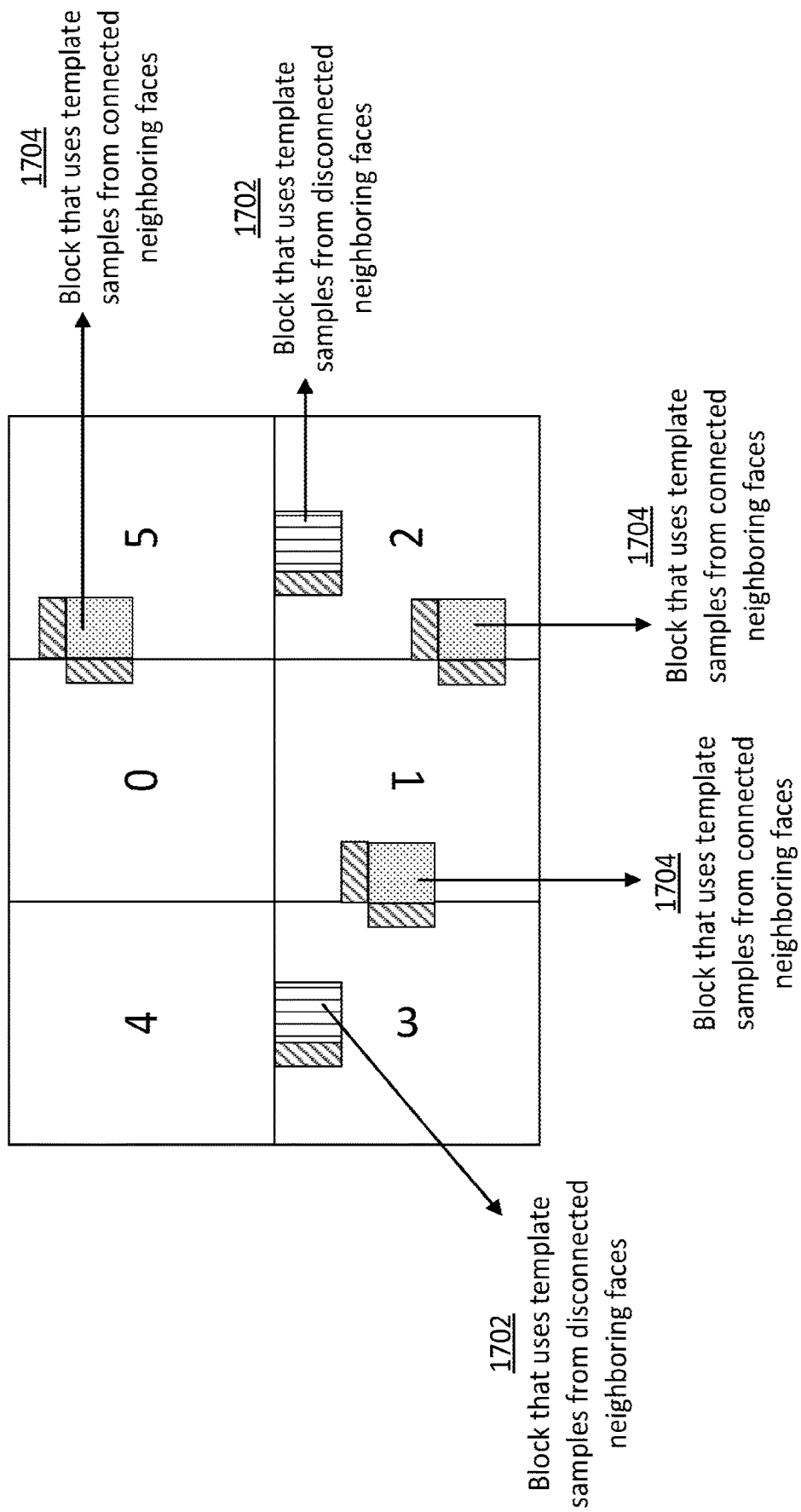
FIG. 17 depicts an example of blocks that may use template samples from connected and/or disconnected neighboring faces.

FIG. 17 depicts an example of blacks that use template samples from connected neighboring faces and the blocks that use template samples from disconnected neighboring faces based on CMP projection format. In FIG. 17, dotted blocks 1704 may represent the coding blocks located on the boundary between the current face and a geometrically neighboring face in 3D space. The samples in the left and above templates of the dotted blocks may be marked as available. Striped blocks 1702 it FIG. 17 may represent the coding blocks located on the boundary between the current face aid a geometrically discontinuous face in 3D space. The samples of the left template of the striped blocks (e.g., not the top template) may be available for template-based.

An encoder and/or a decoder may determine the location and/or orientation of template pixels for a template-based coding.

For a current block located in a first face of a multi-face projection format, whether a template of the current block resides in the first face may be determined. If the template of the current block does not reside in the first face, the location and/or orientation of the template of the current block may be determined. For example, a geometric relationship between the faces of the multi-face projection format may be used to identify a second face. The second face may differ from the first face and the template of the current block may reside in the second face. A face-packing relationship may be used to identify the location and/or orientation of the template of the current block in the second face within the multi-face projection format. The template for prediction of the current block may be used according to the template-based coding.

The template based coding may be IC, FRUC, or other prediction which may be associated with one or more templates of coded (e.g., already encoded and/or decoded) pixels which may adjoin the location of a current block in the current frame or in a coded (e.g., already encoded and/or decoded) reference frame. The template may be a "top" template located above the current block, a 'left' template located to the left of the current block, a "bottom" template located below the current block, a "right" template located to the right of the current block, or other template defined to adjoin the current block at a relative location. The multi-face projection format may be a cubemap format, an octahedral format, an icosahedral format, or other multi-face projection format where the faces may be packed into a 2D frame for compression. The geometric relationship may define the relationship between faces in a 3D geometry, as illustrated in FIG. 16A The face-packing relationship may specify the locations and/or orientations of the one or more faces within a face-packed 2D projection format. For example, the arrangement of packed faces may be illustrated in FIG. 16C.

When geometry padding is used for coding 360-degree video, if a block refers to a sample that is outside the region of the current face, the reference sample value may be generated. For example, the reference sample value may be generated by projecting the corresponding sample of the neighboring face into the current face using, for example 3D geometry. The motion vector of one or more blocks in a face may not refer to a reference sample that may exceed the padded region of the face in the reference picture. Motion information of spatial and/or temporal neighboring blocks may be used to predict the motion information or to generate the motion compensated signal of the current block. If the position of the current block is located on one or more face boundaries, the current block's spatial and/or temporal neighbor may be from a neighboring face. If the current face and its neighboring face are not contiguous in 3D space, the motion of the current block and its spatial and/or temporal neighbors may not have correlation (e.g., obvious correlation). Motion vector may be predicted based on 3D geometry.

Figure 18:
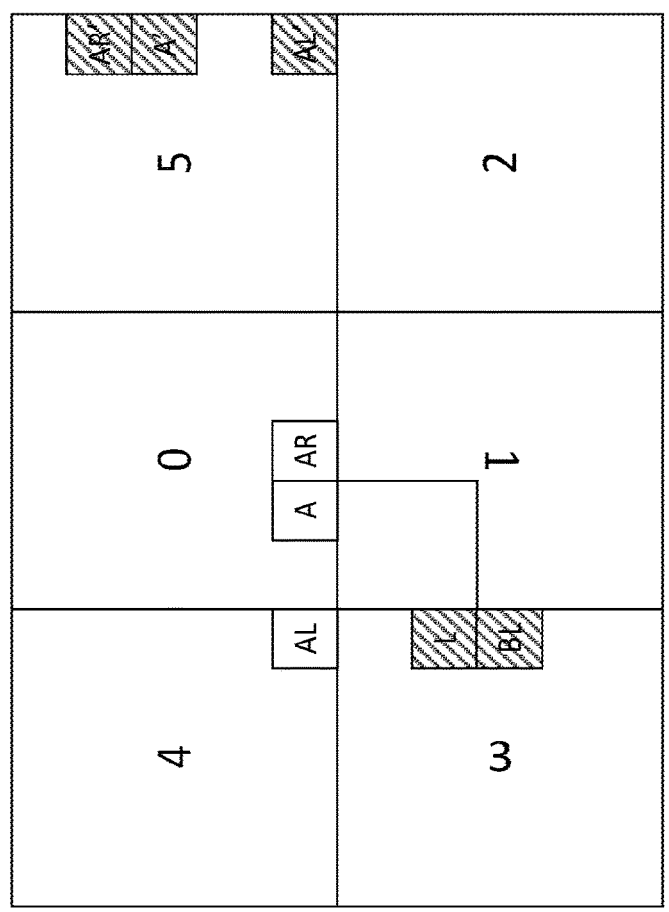
FIG. 18 depicts an example geometry-based motion prediction using merge mode.
Figure 18:
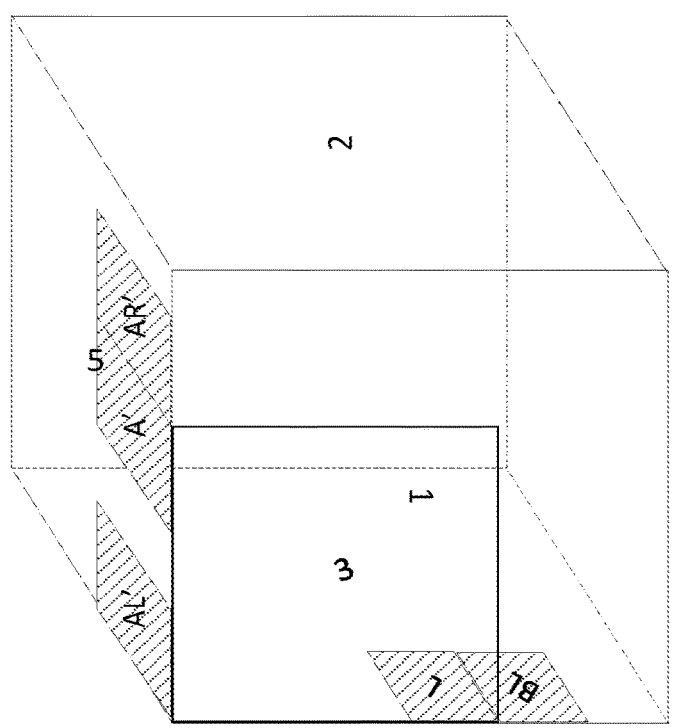

3D geometry may be applied to derive the motion vector of a reference block. For example, the motion vector of a reference block may be derived base on 3D geometry when its position is outside of the face to which the current block belongs. Motion vector prediction based on 3D geometry may provide an efficient motion vector predictor for the blocks that may be located on face boundaries. FIG. 18 depicts an example of geometry-based motion prediction using merge mode. As shown in FIG. 18, five spatial neighbor candidates (e.g., left (L), above (A), below-left (BL), above-right (AR), and above-left (AL)) may be used. As the current block is located in face #1 and face #1 and face #3 are neighboring faces in 3D geometry, the corresponding left and below-left neighbors may be derived from face #3 (e.g., the neighboring blocks derived using 3D geometry information may be the same for the L and/or BL candidates). For the above, above-right, and/or above-left neighbors, the blocks on the face boundary of face #6 (e.g., which is contiguous face to face #1 according to 3D geometry), that is, blocks A', AR', and AL' respectively in FIG. 18 may be used. Given the 3D continuity between face #1 and face #5, geometry-based derivation may provide motion vector predictors that may be correlated with the motion vectors of the current block. One or more faces may be rotated during the frame-packing process (e.g., face #1 and/or 3 in FIG. 18). When the corresponding reference block is derived from a different face, the motion vector may be rotated. For example, in FIG. 18, as face #1 may be rotated (e.g., rotated counter-clockwise) by 180-degree in frame-packed CMP picture, the motion vectors derived from A', AR', and/or AL' in face #5 may be rotated (e.g., rotated counter-clockwise) by 180-degree to be aligned with the coordinates of the motion vectors of the current block in face #1.

For example, in FIG. 18, to predict the motion vector of the current block in face #1, an encoder and/or a decoder may maintain one or more (e.g., all) the motion information of the blocks on the right boundary of face #5. A motion vector candidate may be disabled (e.g., motion vector candidate considered unavailable) if the corresponding neighboring block is outside the boundary of the current face. For example, one or more of the five motion vector candidates L, A, BL, AR, and/or AL) in FIG. 18 may be treated as invalid for merge process, as motion vector candidates may not be in the same face as the current block. Motion vector candidates may be disabled if the motion vector candidates are from a neighboring face that may not be geometrically adjacent to the current face in 3D space. For example, if the reference block is located in a face that is geometrically neighboring to the current face, the corresponding motion may be regarded as valid for motion vector prediction of the current block. For example, in FIG. 18, the reference blocks L. and/or BL may be regarded as valid candidates, whereas the reference blocks A, AR, and/or AL may be regarded as invalid candidates when predicting the motion vectors of the current block.

An encoder and/or a decoder may determine the location and/or the orientation of a motion vector candidate for use in a motion vector prediction. For a current block, whether the block providing the motion vector candidate resides in the same face as the current block may be determined. If the block providing the motion vector candidate does not reside in the same face as the current block, the location and/or the orientation of the block providing the motion vector candidate may be determined, e.g., based on a geometric relationship. The geometric relationship between the faces of a multi-face projection format may be used to identify a face (e.g., different than the face that includes the current block) in which the block providing the motion vector candidate resides. A face-packing relationship may be used to identify the location and/or the orientation of the block providing the motion vector candidate in the identified face in the multi-face projection format. The motion vector candidate may be retrieved based on the identified location and/or the orientation of the block. The retrieved motion vector candidate may predict the motion of the current block according to the motion vector prediction.

Whether a block providing the motion vector candidate resides in the sane face as the current block may be determined. For example, determining whether the block providing the motion vector candidate resides in the same f7ace as the current face may be determined using a position of the block providing the motion vector candidate relative to the position of the current block. Examples of such relative positions (e.g., AL, A, AR, L, and/or BL) may be illustrated in FIG. 18. One or more candidate motion vectors may be used in the prediction of the motion of the current block. When one or more candidate motion vectors are tooled at various relative positions, the determination of the location and/or the orientation of a motion vector candidate for use in a motion vector prediction described herein may be repeated for the relevant one or more candidate motion vector positions. If the identified orientation of the block providing the motion vector candidate differs from the orientation of the current block within the multi-face projection format, the motion vector may be rotated to compensate for the difference in orientation. The multi-face projection format may be a cubemap format an octahedral format, an icosahedral format, or other multi-face projection format where the faces may be packed into a 2D frame for compression. The geometric relationship may define the relationship between faces in a 3D geometry, e.g., as illustrated in the 3D cube pictured on the left side of FIG. 18. The face-packing relationship may specify the locations and/or the orientations of the one or more faces within a face-packed 2D projection format, as illustrated in the arrangement of faces on the right side of FIG. 18.

An encoder and/or a decoder may determine whether a motion vector candidate is available for use in a motion vector prediction. For a current block, whether the block providing the motion vector candidate resides in the same face as the current block may be determined. If the block providing the motion vector candidate does not reside in the same face as the current block, a geometric relationship between the faces of the multi-face projection format may be used to identify a face (e.g., different than the face that includes the current face) in which the block providing the motion vector candidate resides. A face-packing relationship may be used to determine whether the block providing the motion vector candidate is in its proper neighboring position relative to the current block within the multi-face projection format Whether the block providing the motion vector candidate is not in its proper neighboring position relative to the current block, due to a discontinuity at the border between the same face as the current block and the identified face, may be determined. If the block proving the motion vector candidate is determined to be in its proper neighboring position relative to the current block, the motion vector candidate may be marked as available for prediction. If the motion vector candidate is available for prediction, the motion vector candidate may predict the motion of the current block, e.g., according to the motion vector prediction. If the block providing the motion vector candidate is not in its proper neighboring position relative to the current block, the motion vector candidate may be marked as unavailable for prediction.

An encoder and/or a decoder may determine whether a motion vector candidate is available for use in a motion vector prediction. For a current block, whether the block providing the motion vector candidate resides in the same face as the current block may be determined. If the block providing the motion vector candidate resides in the same face as the current block, the motion vector candidate may be marked as available for prediction. If the motion vector candidate is available for prediction, the motion vector candidate may predict the motion of the current block based on the motion vector prediction described herein. If the block providing the motion vector candidate does not reside in the same face as the current block, the motion vector candidate may be marked as unavailable for prediction.

When 360-degree video is projected onto multiple faces (e.g., using CMP), one or more face pictures may look similar to a 2D picture. Rectilinear projection may cause shape distortions (e.g., for objects close to face boundaries). A continuous structure in the 3D space may not be continuous when the continuous structure crosses face boundaries on the frame-packed 2D picture. For example, a straight line crossing two neighboring faces may become two line segments in different directions at the boundary of the two neighboring faces. The motion across the face boundary may become discontinuous. For example, a moving object may change its motion direction after crossing the face boundary. In the geometry-based motion vector prediction described herein, the motion vector of a reference block derived based on, for example, 3D geometry (e.g., the reference block may be rotated if necessary) may be used as the motion vector predictor to predict the motion vector of the current block. When crossing face boundary, motion direction may change. Predicting the motion vectors of the blocks on face boundaries using the motion vectors from neighboring faces may be difficult. An example of a motion vector projection may be applied for motion vector prediction of 360-degree video. If the current block and its reference block are from different faces, using geometry information in the motion vector domain may project the motion vector of the reference block onto the face where the current block belongs before motion vector prediction may be applied. The motion vector projection described herein may be similar to geometry padding and may be based on the rectilinear projection between a 3D point and the corresponding point on a 2D projection plane.

Figure 19:
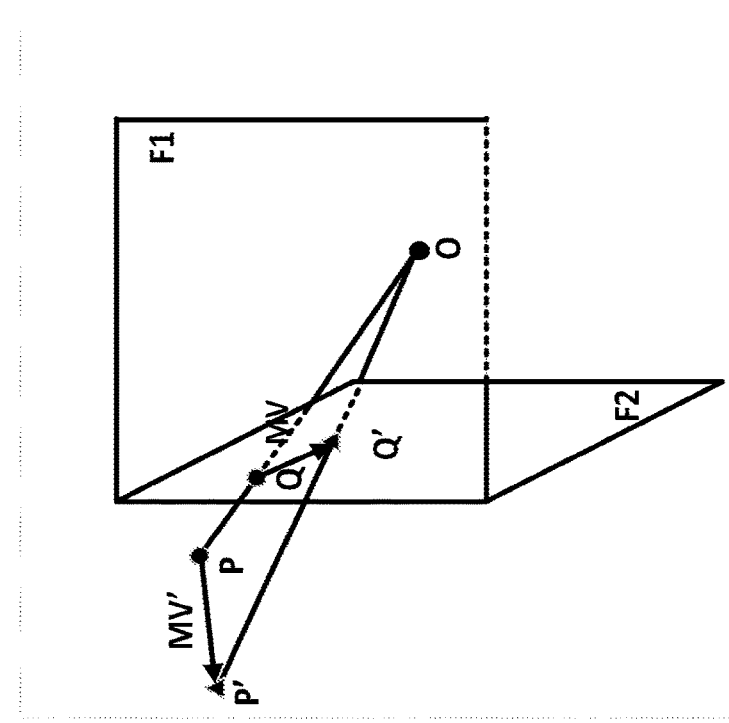
FIG. 19 depicts an example geometry-based motion vector projection between different faces.

Based on the CMP format FIG. 19 depicts an example of geometry-based motion vector projection between different faces. In FIG. 19, face F1 may be the current face and face F2 may be the reference face that includes the points Q and Q'. Point Q may be the center of the sphere. Points Q and Q' may be two points on face F2 and may be used to specify the reference motion vector MV. To project MV onto face F1, the motion vector projection may derive the corresponding projection points of Q and Q' on face F1 (e.g., P and P') based on, for example the rectilinear projection originating from the center O. The projected motion vector MV' may be specified by using P and P' as, for example, the initial and ending points. As shown in FIG. 19, the projected motion vector MV' may determine the impact of 3D geometry on motion trajectory. The projected motion vector MV' may estimate the motion vector in face F1. In FIG. 19, the starting point and ending point of the reference motion vector MV (e.g., Q and Q') may specify the locations of the block and may provide motion vector candidate and its reference block in the same face. When the motion vector projection is applied, different positions in a block may be used to define the corresponding motion vector predictor. Using different positions may affect the value of projected motion vector due to the projection distortion caused by rectilinear projection. For example, the motion vector may begin at the top-left corner of a block and may end at the top-left corner of its reference block. For example, a motion vector may begin at the center of a block and may end at the center of its reference block.

The geometry-based reference block derivation described herein and/or the geometry-based motion vector projection described herein may be operated (e.g., operated together or independently) from each other. The geometry-based reference block derivation may be combined with, for example, the geometry-based motion vector projection for motion vector prediction of 360-degree video. One or more motion vector candidates of the current block may be derived. For example, the motion vector of the corresponding geometric neighboring block may be fetched according to geometry-based reference block derivation described herein. The motion vector may be projected using the geometry-based motion vector projection described herein. The projected motion vector may be used as the motion vector predictor of the current block. The geometry-based reference block derivation may be used for motion vector prediction of 360-degree video. For example, the geometry-based reference block derivation may be used for motion vector prediction of 360-degree video disabling geometry-based motion vector projection. The motion vector of the geometrical neighboring block may be used as candidate for motion vector prediction. The reference block derivation (e.g., relying on the spatial and/or temporal neighbors) may be combined with the geometry-based motion vector projection for predicting motion vectors of 360-degree video. Motion candidates may be fetched from the spatial and/or temporal neighboring blocks of the current block and may be adjusted according to the motion vector projection scheme (e.g., if the reference block is from a different face) before being used for predicting the motion vector of the current block.

Figure 20:
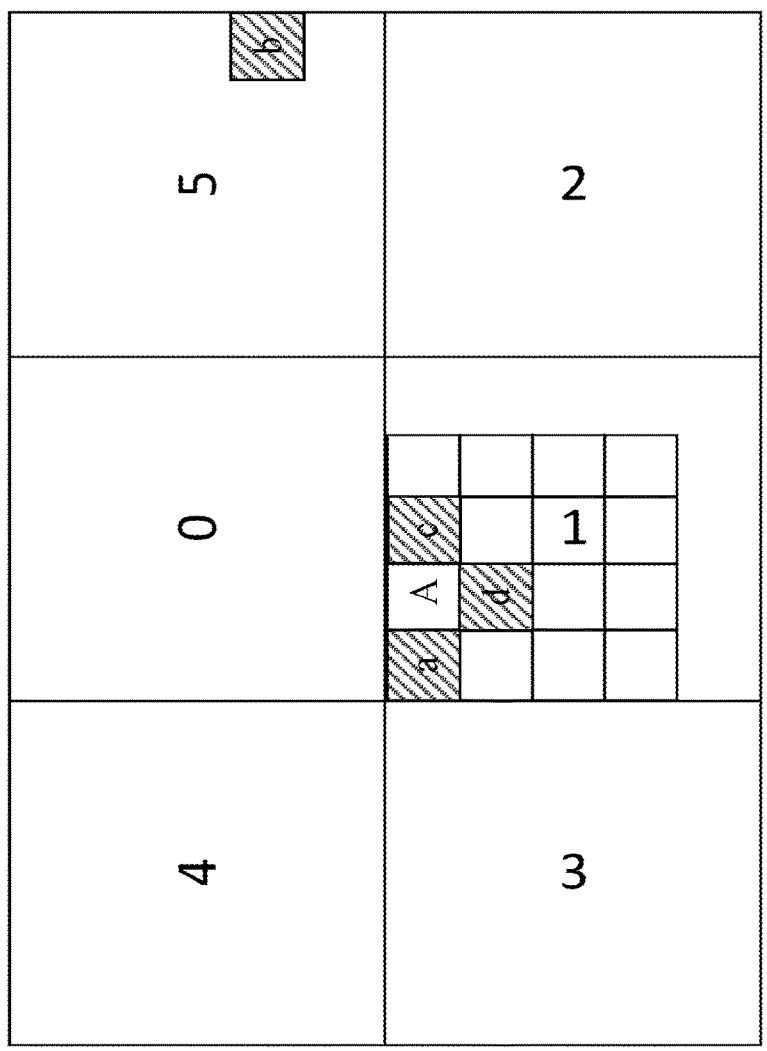
FIG. 20 depicts an example geometry-based reference block derivation for OBMC.

CMP format and/or merge mode may be used to discuss the geometry-based reference block derivation and/or geometry-based motion vector projection described herein. The geometry-based reference block derivation and/or geometry-based motion vector projection may be applicable to other 360-degree video projection formats and/or inter coding tools. Without loss of generality, FIG. 20 depicts an example of geometry-based reference block derivation for OBMC. In FIG. 20, the prediction signal of sub-block A in the current block may be calculated as the weighted average of the motion compensated prediction signals using, for example the motion vectors of four neighboring sub-blocks.

In FIG. 20, the sub-block A may be located on the top boundary of face #1. As shown in FIG. 20, the left neighbor 'a', the right neighbor 'c', and the bottom neighbor 'd' may be derived from the spatial neighbors. Based on the geometry-based reference block derivation, the above neighbor 'b' may be obtained from face #5. For example, the above neighbor 'b' may be obtained from face #5.

A video encoder and/or a video decoder may determine a motion vector prediction candidate for a current block in a same face as the current block. The location of the block, which provides the motion vector candidate (e.g., relative to the location of the current block), may be determined. The location of the block, which provides the motion vector candidate, may be determined based on whether the location of the block is within the same face as the current block. If the location of the block is not in the sane face as the current block, the motion vector candidate may be determined as described herein. A geometric relationship may be used between the faces of the multi-face projection format to identify a face (e.g., different from the face that includes the current block) in which the block which provides the motion vector candidate resides. The block that provides the motion vector candidate in the identified face may be identified. A representation of the motion vector in the identified face may be determined. The representation of the motion vector may be projected from the identified face to the plane of the same face as the current block. The projected motion vector may be used as a motion vector prediction candidate for the current block.

The multi-face projection format may be a cubemap format, an octahedral format, an icosahedral format, or other multi-face projection format where the faces may be packed into a 2D frame for compression. The geometric relationship may define the relationship between faces in a 3D geometry, as illustrated in FIG. 16A Identification of the block which provides the motion vector candidate in the identified face may use a face-packing relationship associated with the multi-face projection format. Determining the representation of the motion vector in the identified face may include determining the location of a pair of endpoints for the motion vector in the identified face. In this case, projection of the motion vector from the identified face to the plane of the same face as the current block may include projection of one or more endpoints of the pair of endpoints from the identified face to the plane of the same face as the current block. The motion vector prediction candidate may be a prediction candidate for predicting a motion vector of the current block. The motion vector prediction candidate may be one of multiple motion vector prediction candidates to be considered for use or to be used in the prediction of the current block.

When a QT/BT node is across the boundary between two faces, the corresponding QT/BT splitting indication (e.g., flag) may be skipped. The value (e.g., 1) may be inferred (e.g., to be further split). When a QT/BT node is inside a face, the QT/BT signaling may be applied. For example, the QT/BT signaling may signal an indication (e.g., flag) to indicate whether the current node may be further split or not. The indication (e.g., splitting flag) set to a value (e.g., 1) for the QT/BT nodes across face boundaries may infer that face boundaries may aligned with the boundaries of QT/BT leaf nodes. QT/BT leaf node may include samples from a face after, for example, the QTBT partitioning described herein may be applied.

A parameter, MaxBTDepth (e.g., in the QTBT design), may specify the maximum depth of allowed binary-tree partitioning. A QT/BT node may be split (e.g., split horizontal), or vertically) when the depth of the current binary-tree does not reach MaxBTDepth. A QT/BT node that is across multiple faces may not be able to provide enough partition granularities to support the separation of the face boundaries using ST partitions. Quad-tree (QT) partitions (e.g., only QT partitions and not both QT and binary-tree (BT) partitions) may be used to align with face boundaries. For example, CTU may be partitioned (e.g., firstly partitioned) in the QT manner, and QT node may be enforced to be split if the QT node covers one or more face boundaries. The QT splitting may be iterated until one or more of the corresponding descendent QT nodes may be contained (e.g., completely contained) in a face. QT node may be partitioned (e.g., further partitioned) by the BT. One or more (e.g., all) enforced BT splitting that are used to align with face boundaries may be counted towards the total depth of the corresponding BT structure. When a QT/BT node spans into one or more faces, the corresponding BT indication (e.g., splitting flag) may be inferred to further split (e.g., flag set to 1) without being signaled. If the indication (e.g., flag) is not signaled, the corresponding BT splitting (e.g., which may be used to align with face boundaries) may not be considered when calculating the total depth of the current BT structure. BTs may be split (e.g., further split) to align with face boundaries without being subject to the constraint of MaxBTDepth.

In the constrained QTBT partition described herein, a QT/BT leaf node may be used as the basic unit to align with face boundaries. The size of one or more faces may be one or more of the size of the basic unit to ensure enough block-partitioning granularity. For example, for approach of skipping signaling QT/BT splitting indication (e.g., flag) when a QT/BT node is across the boundary between two faces as described herein, the face size may be multiple of minimum BT size (e.g., MinBTSize). For approach of using QT partitions to align with face boundaries described herein, the face size may be multiple of minimum QT size (e.g., MinQTSize). The constrained QTBT partitioning described herein may be applied to inter coded pictures where geometry padding is applied. The constrained QTBT partitioning described herein may be applied to inter coded pictures (e.g., B and/or P pictures) and may be disabled for infra coded pictures (e.g., I pictures). The constrained QTBT partitioning may be applied to the video blocks of the 360-degree (e.g., entire 360-degree) video sequence. Within the 360-degree (e.g., entire 360-degree) video block, homogeneous area may exist across faces boundaries (e.g., sky, ground, and/or water). Homogeneous area (e.g., which may be across face boundaries) may be put into a coding block (e.g., large coding block) aid may save signaling overhead of coding mode, motion related information, and/or residual. An indication (e.g., a flag) may be used to be signaled at a high-level (e.g., video parameter set (VPS), sequence parameter set (SPS), picture parameter set (PPS), and/or the slice header) for enabling and/or disabling the QTBT partitioning. Region-based enabling and/or disabling may be applicable to the constrained QTBT partitioning described herein. The constrained QTBT partitioning may be applied to face boundary areas that show heterogeneous characteristics while disabled for homogeneous face boundaries. For example, if the frame packed picture includes 6 faces in total, a bit may be signaled for one or more faces to indicate whether the constrained QTBT partitioning approach is applied to that face or not. The constrained QTBT partitioning structure described herein may be applicable to other block partitioning frameworks including, but not limited to, the quad-tree based partitioning in HM, asymmetric block partitioning, and/or multi-type-tree partitioning.

Figure 21:
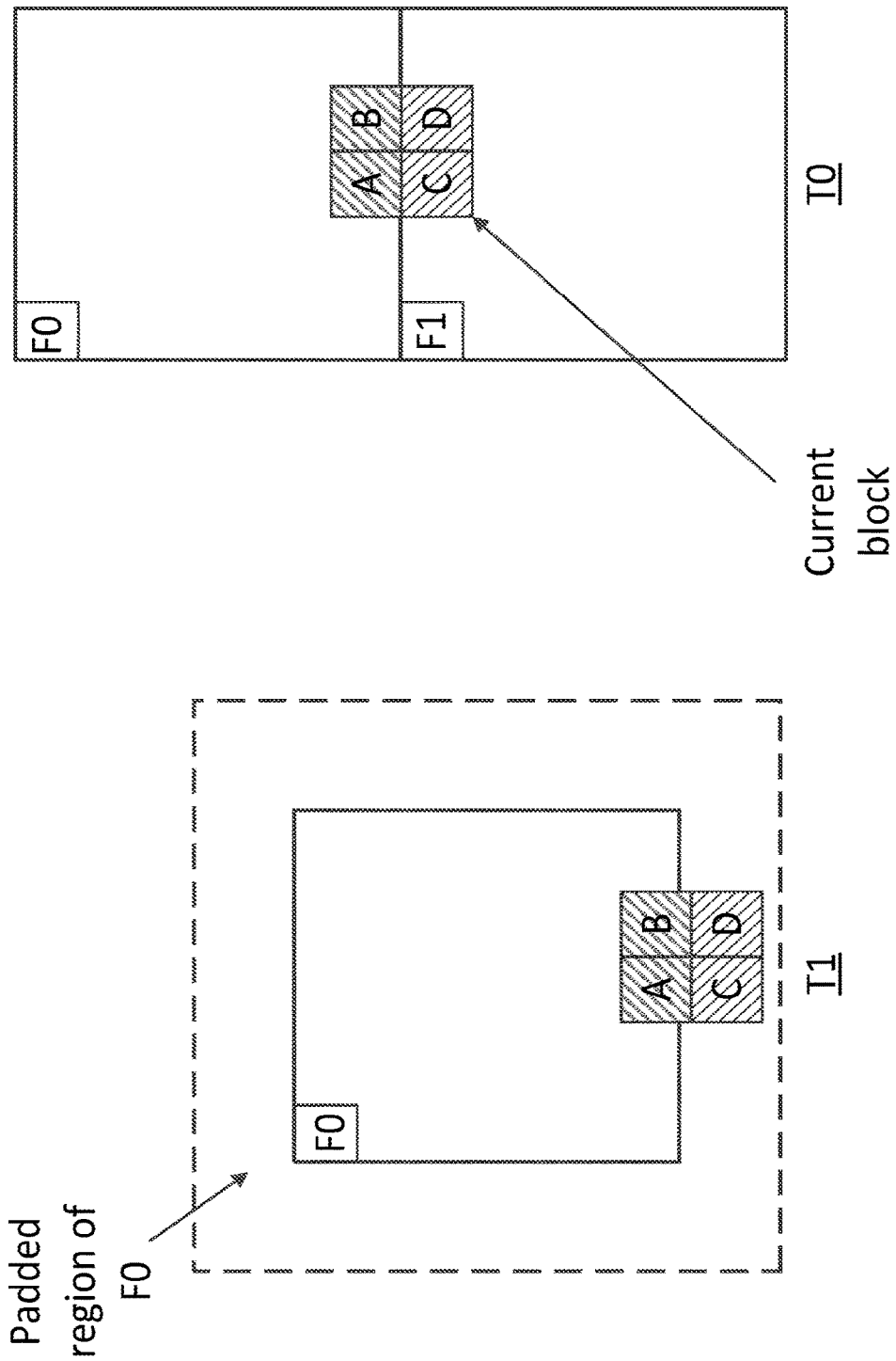
FIG. 21 depicts an example of unconstrained QTBT block partitioning with geometry padding applied.

The QTBT partition constants may be used to ensure that the current block includes sample(s) in a face (e.g., a single face). For example, mismatched reference block due to geometry padding may be avoided. One or more sub-block level motion compensation techniques (e.g., ATMVP and/or STMVP) may be supported. The one or more sub-block level motion compensation techniques may allow a large block to split into one or more small sub-blocks and/or may derive own motion information for one or more sub-blocks. The large block may be a current block that is associated with 360-degree video. The face-based sub-block motion compensation described herein may increase the usage of large coding blocks (e.g., QT/BT leaf node) in a QTBT block partition structure. When a video block is across the boundaries of one or more faces (e.g., which may not be contiguous in 3D space), the approach of using coding blocks (e.g., large axing blocks) in a QTBT block partition structure may be used for 360-degree video coding since the sub-blocks (e.g., which may represent different objects from various faces) inside the current block may be predicted using different motion information. When geometry padding is applied (e.g., jointly applied) with sub-block level motion compensation techniques, different approaches may be applied to derive the reference samples for one or more sub-blocks at the motion compensation stage. For execrate, the reference samples of one or more (e.g., all) the sub-blocks in the current block may be derived from the padded region of a face (e.g., a single face). For example, as shown in FIG. 21, the top-left sample of the current block may be located in face F0. One or more (e.g., all) the motion compensated prediction signals of the sub-blocks in the current block may be generated from the padded region of face F0. In FIG. 21, the coordinate of the top-left sample in the current block may be used to select the face used for motion compensated prediction. Samples at different location in the current block may be applied. For example, the sample at the center of the current block may be applied. If the two faces (e.g., which may be neighbors in a frame-packed picture) are not adjacent according to 3D geometry, video samples across a face boundary may not show correlation (e.g., strong correlation). For example, as shown in FIG. 21, the sub-blocks C and/or D may not be predicted (e.g., well predicted) by using the samples in the padded region of F0.

Figure 22:
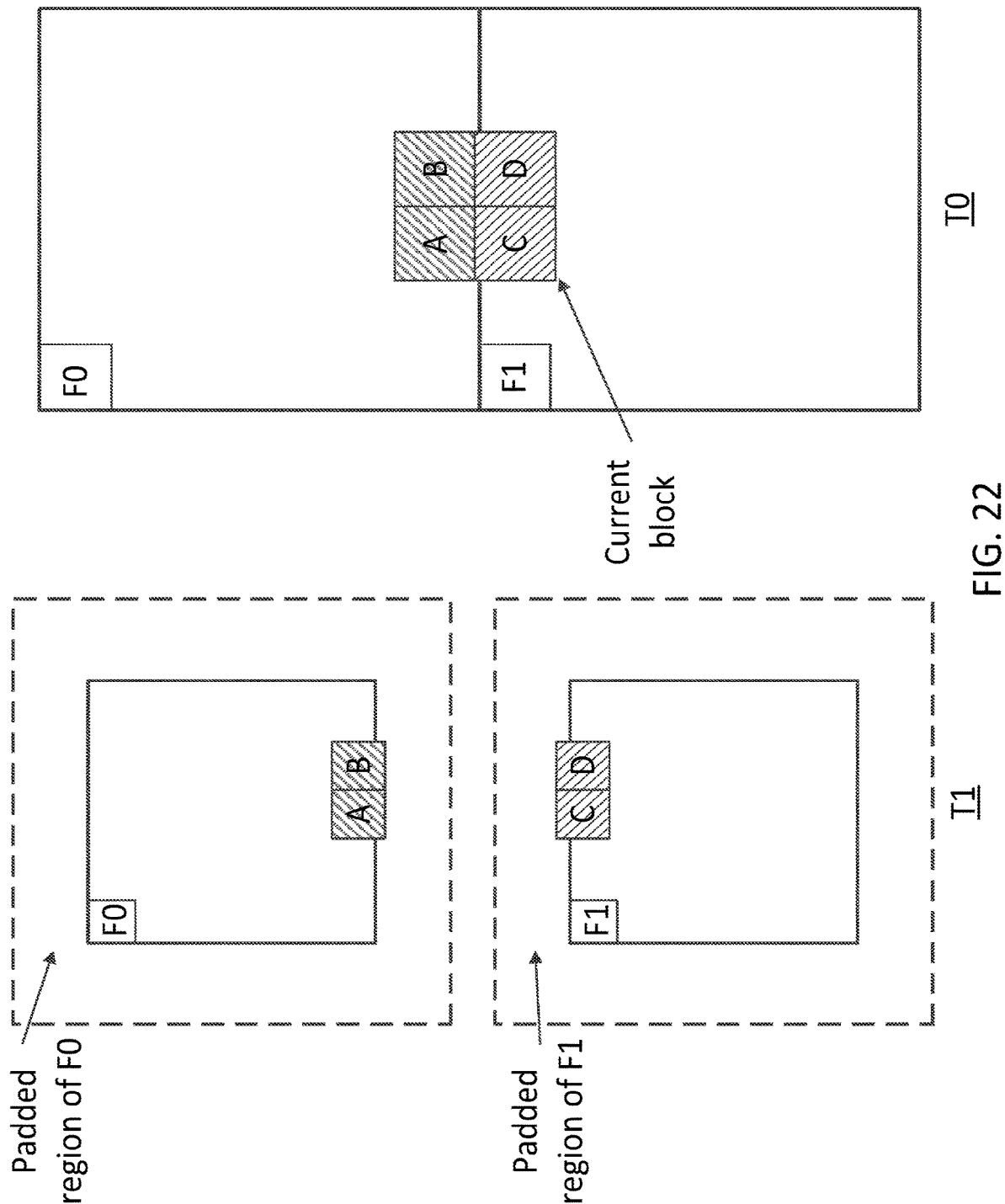
FIG. 22 depicts an example of unconstrained QTBT block partitioning with inside-face motion compensation.

A face-based sub-block motion compensation may be used when geometry padding is applied for oozing 360-degree video. Fine-granularity motion of sub-block mode on coding video blocks on face boundaries may be utilized, and the QTBT block partition may be applied without a constraint in using QT partitions to align with face boundaries as described herein. A QTBT leaf node may be allowed to occupy the regions of one or more faces. The face-based sub-block motion compensation may predict the samples of one or more sub-blocks using the motion compensated prediction signal from the padded region of the corresponding face that sub-block belongs to. FIG. 22 depicts an example of unconstrained QTBT block partitioning with inside-face motion compensation. In FIG. 22, sub-blocks A and/or B may be predicted from the padded region of face F0, and sub-blocks C and/or D may be predicted from the padded region of face F1. The approach described herein and shown in FIG. 22 may provide correlated (e.g., more correlated) prediction signals for sub-block C and/or D.

The sub-block motion compensation described herein may be applied to one or more sub-block level motion compensation mode. The sub-block level motion compensation mode may include, but not limited to, ATMVP mode, STMVP mode, FRUC mode, and/or affine mode. When the sub-block motion compensation is enabled, video blocks at face boundaries may be coded by the sub-block level motion compensation mode(s). If A video block is found to be across one or more face boundaries, the video block may be coded by the coding mode(s). The coding mode(s) may be used to derive motion information at a sub-block level.

For example, if a sub-block mode is used for the current block and if the current block includes samples located on multiple faces associated with 360-degree video content one or more samples in the current block may be predicted based on sub-block level face association. For a sub-block in the current block (e.g., a first sub-block and/or a second sub-block), a location of the sub-block may be identified. Tire sub-block may be associated with a face based on the identified location of the sub-block. A sample in the sub-block may be predicted based on the face that is associated with the sub-block.

Signaling of an indication (e.g., flag) to indicate coding mode may be skipped. For example, the coding modes (e.g. which may associate a single motion vector for a direction for the whole block) may not be examined during the rate distortion process at the encoder. One or more (e.g., all) allowed coding modes (e.g., with sub-block level motion or without sub-block level motion) may be allowed to code video blocks at face boundaries. Signaling a syntax (e.g., additional signaling syntax) may be applied to indicate which coding mode is selected.

Figure 23A:
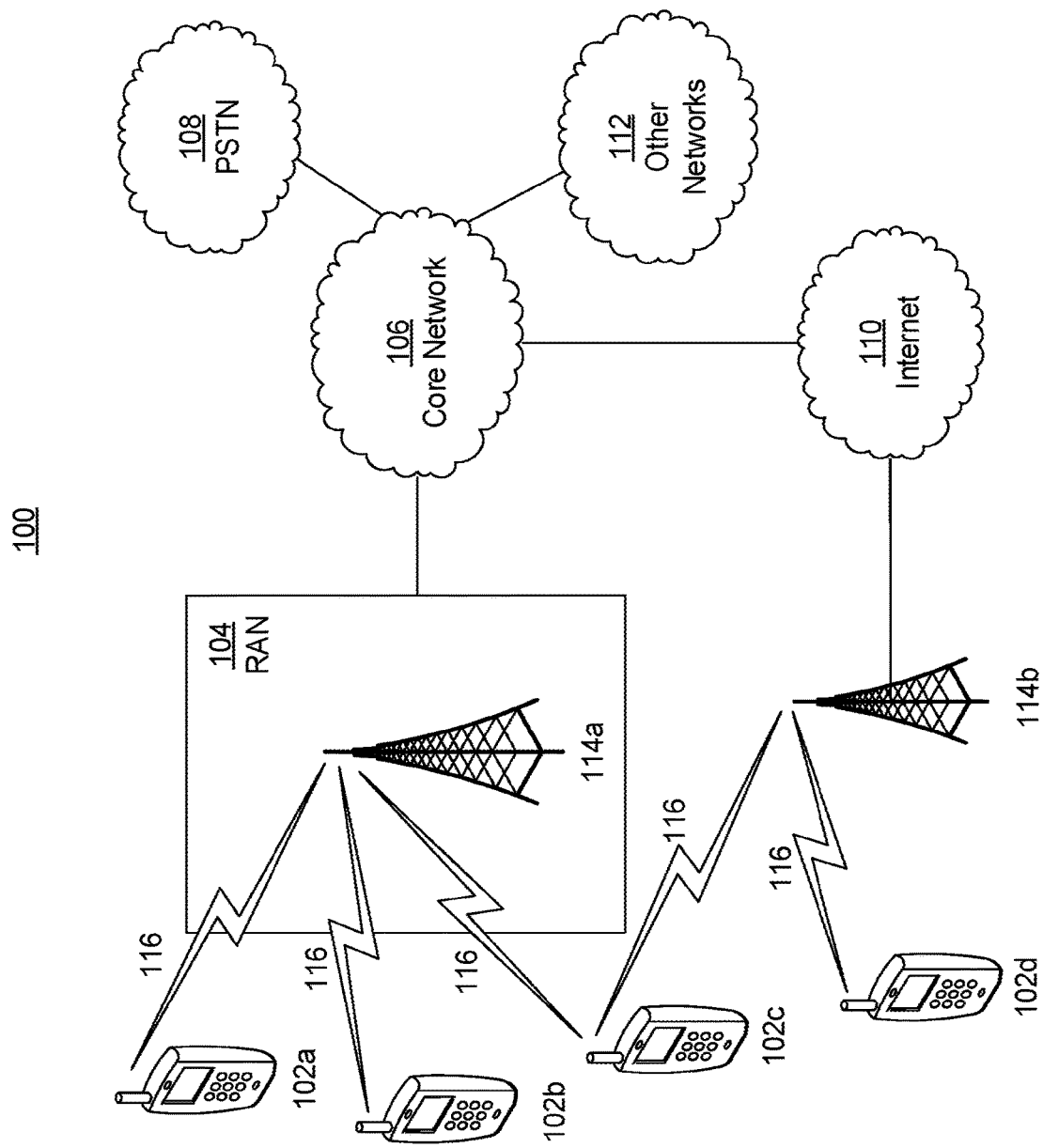
FIG. 23A is a system diagram illustrating an example communications system in which one or more disclosed embodiments may be implemented.

FIG. 23A is a diagram illustrating an example communications system 100 in which one or more disclosed embodiments may be implemented. The communications system 100 may be a multiple access system that provides content, such as voice, data, video, messaging, broadcast etc., to multiple wireless users. The communications system 100 may enable multiple wireless users to access such content through the sharing of system resources, including wireless bandwidth. For example, the communications systems 100 may employ one or more channel access methods, such as code division multiple access (COMA), time division multiple access (TWA), frequency division multiple access (PIMA), orthogonal FDMA (OFDMA), single-carrier FDMA (SC-FDMA), zero-tail unique-word OFT-Spread OFDM (ZT UW DTS-s OFDM), unique word OFDM (UW-OFDM), resource block-filtered OFDM, filter bank multicarrier (FBMC), and the like.

As shown in FIG. 23A, the communications system 100 may include wireless transmit/receive units (WTRUs) 102a. 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (MD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred b as a cell (not shown). These frequencies may be in licensed spectrum, unlicensed spectrum, or a combination of licensed and unlicensed spectrum. A cell may provide coverage for a wireless service to a specific geographical area that may be relatively fared or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible tight etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may Implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as ugh-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (MAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 23A may be a wireless router, Home Node B, Home eNode B, or access point for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 23A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over Internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the tike. The CN 106/115 may provide call control, billing services, mobile location-based services, pre-paid calling, Internet connectivity, video distribution, etc., and/or perform high-level security functions, such as user authentication. Although not shown in FIG. 23A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) emptying a GSM, UMTS, CDMA 2000, WiMAX, E-UTRA, or WiFi redo technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the Internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may Include multi-mode capabilities (e.g., the WTRUs 102a, 102b, 102c, 102d may include multiple transceivers for communicating with different wireless networks over different wireless links). For example, the WTRU 102c shown in FIG. 23A may be configured to communicate with the base station 114a, which may employ a cellular-based radio technology, and with the base station 114b, which may employ an IEEE 802 radio technology.

Figure 23B:
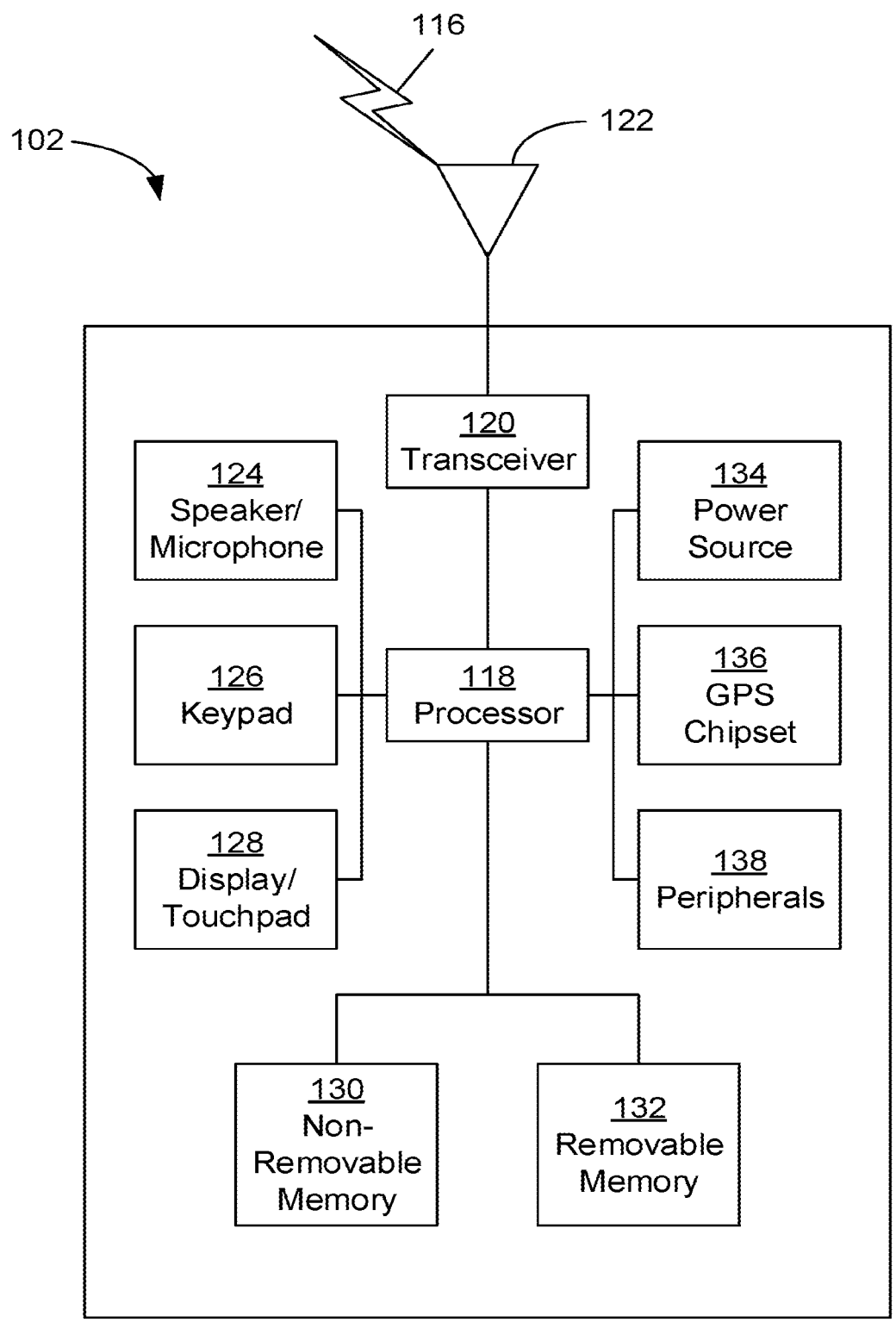
FIG. 23B is a system diagram illustrating an example wireless transmit/receive unit (WTRU) that may be used within the communications system illustrated in FIG. 23A according to an embodiment.

FIG. 23B is a system diagram illustrating an example WTRU 102. As shown in FIG. 23B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 23B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 23B as a single element, the WTRU 102 may include any natter of transmit/receive elements 122. More specifically, the WTRU 102 may employ MIMO technology. Thus, in one embodiment, the WTRU 102 may include two or more transmit/receive elements 122 (e.g., multiple antennas) For transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user Input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset a Bluetooth® module, a frequency modulated (FM)

radio unit, a digital music player, a media player, a video game player module, an Internet browser, a Virtual Realty and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor, a geolocation sensor, an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choice) or signal processing via a processor (e.g., a separate processor (not shown) or via processor 118). In an embodiment the WRTU 102 may include a half-duplex radio for which transmission and reception of some or all of the signals (e.g., associated with particular subframes for either the UL (e.g., for transmission) or the downlink (e.g., for reception)).

Figure 23C:
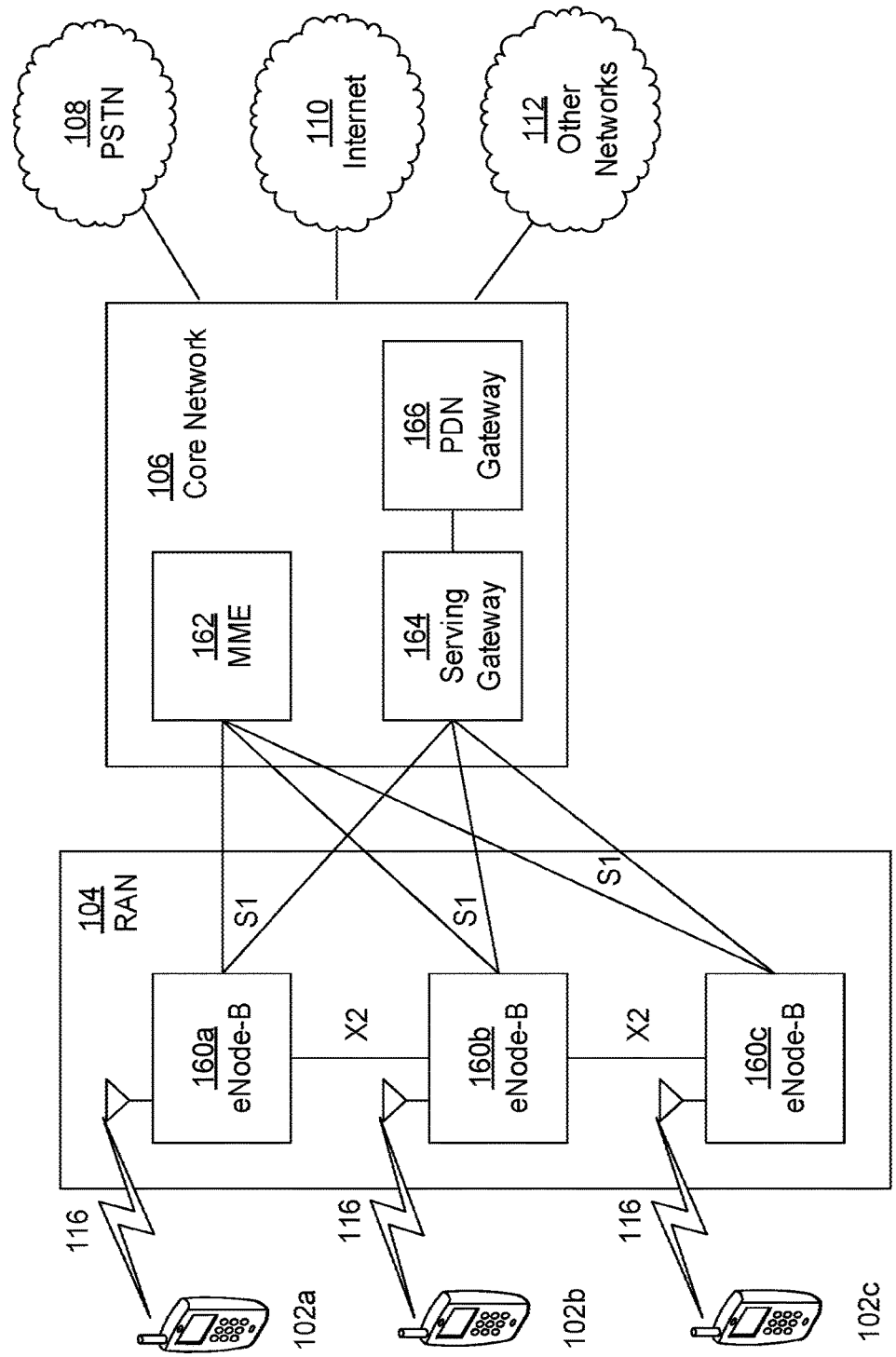
FIG. 23C is a system diagram illustrating an example radio access network (RAN) and an example core network (CN) that may be used within the communications system illustrated in FIG. 23A according to an embodiment.

FIG. 23C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 23C, the etude-Bs 160a, 160b, 160c may communicate with one another over an X2 interface.

The CN 106 shown in FIG. 23C may include a mobility management entity (MME) 162, a serving gateway (SGW) 164, and a packet data network (PDN) gateway (or PGW) 166. While each of the foregoing elements are depicted as pad of the CN 106, it will be appreciated that any of these elements may be owned and or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102c, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 23A-23D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled PIS (TDLS). A WLAN using an Independent BSS (IBSS) mode may not have an AP, and the STAs (e.g., alt of the STAs) within or using the IBSS may communicate directly with each other. The IBSS mode of communication may sometimes be referred to herein as an 'ad-hoc' mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AR In certain representative embodiments, Carrier Sense Multiple Access with Collision Avoidance (CSMA/CA) may be implemented, for example in ln 802.11 systems. For CSMA/CA, the STAs (e.g., every STA), Including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11d and 802.11ah relative to those used in 802.11n, and 802.11 ac. 802.11af supports 5 MHz, 10 MHz and 20 MHz bandwidths in the iv White Space (TVWS) spectrum, and 802.11ah supports 1 MHz, 2 MHz, 4 MHz, 8 MHz. and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

MAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the as support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 23D:
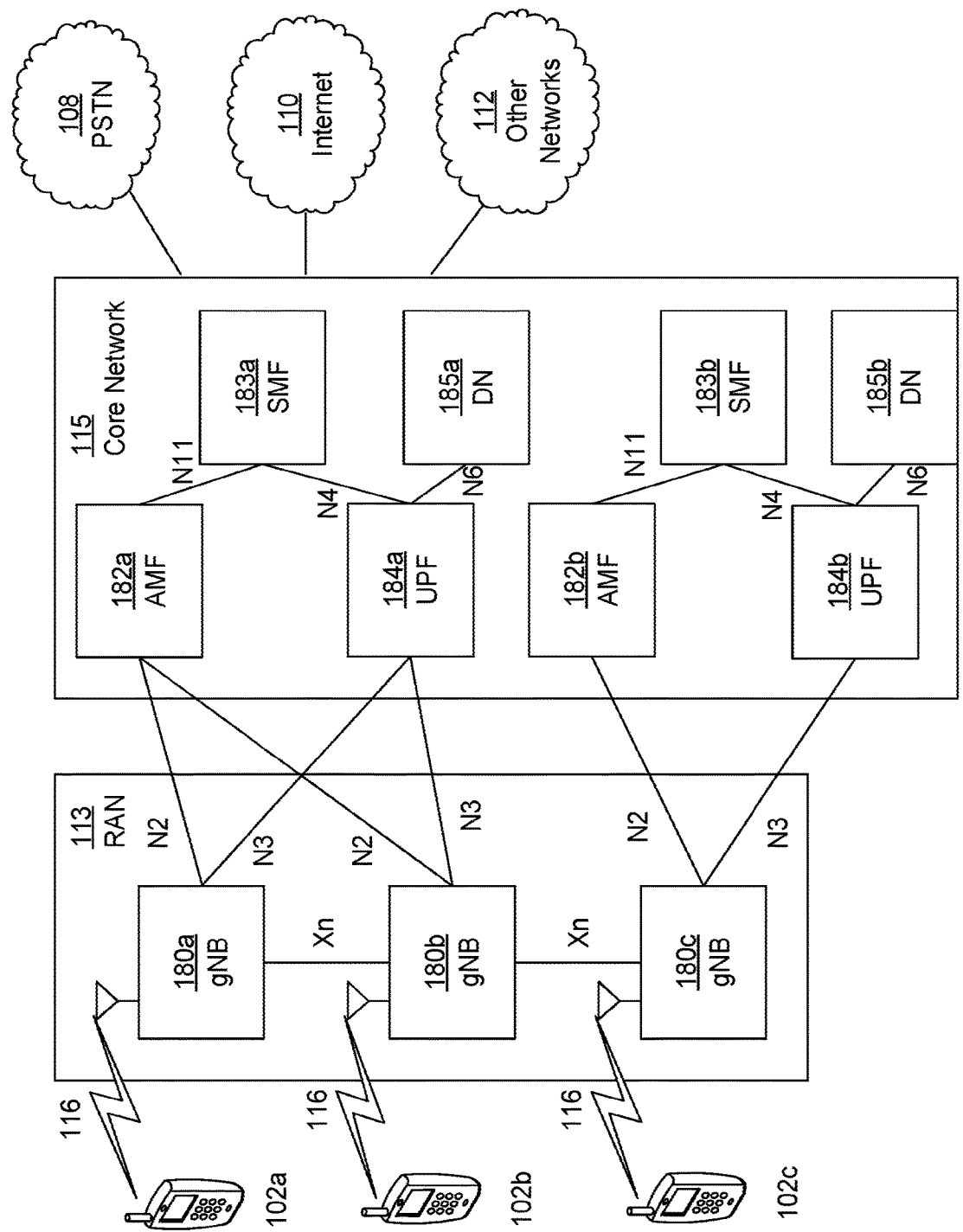
FIG. 23D is a system diagram illustrating a further example RAN and a further example CN that may be used within the communications system illustrated in FIG. 23A according to an embodiment.

FIG. 23D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs white remelting consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and or receive wireless signals from, the WTRU 102a In an embodiment, the gNBs 180a, 180b, 180c may implement cater aggregation technology. For example, the gNB 180a may transmit multiple component carriers to the WTRU 102a (not shown). A subset of these component carriers may be on unlicensed spectrum while the remaining component earners may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a. 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160z). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 23D, the gNBs 180a, 180b, 180c may communicate with one another over an Xn interface.

The CN 115 shown in FIG. 23D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handing of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mottle broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 23A-23D, and the corresponding description of FIGS. 23A-23D, one or more, or al, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or an, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including al, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment Direct RF coupling and/or wireless communications via RF circuitry (e.g., which may include one or more antennas) may be used by the emulation devices to transmit or receive data.

What is claimed:

1. A method of video decoding, comprising:
    obtaining a 360-degree video content comprising a plurality of faces arranged in a frame-packed picture, wherein the plurality of faces comprise a current block in a current face;
    identifying a template sample associated with the current block based on frame-packing information of the 360-degree video content;
    deriving prediction parameters for the current block based on the template sample; and
    predicting the current block based on the derived prediction parameters.

2. The method of claim 1, wherein the frame-packing information comprises an indication of locations and orientations of the plurality of the faces, and the identifying of the template sample further comprises:
    identifying a location and orientation of the template sample based on the locations and orientations of the plurality of the faces.

3. The method of claim 1, wherein the frame-packing information comprises 3D geometry information of the 360-degree video content, and wherein the 3D geometry information is used to determine locations and orientations of the plurality of the faces, and the identifying of the template sample further comprises:
identifying a location and orientation of the template sample based on the locations and orientations of the plurality of the faces.

4. The method of claim 1, wherein the current face is a first face, further comprising:
determining that the current block is located at a boundary of the first face;
in response to determining that the current block is located at the boundary of the first face, identifying a second face that comprises the template sample based on the frame-packing information; and
deriving the prediction parameters using template-based coding for the current block based on the template sample.

5. The method of claim 1, wherein the derived prediction parameters comprise illumination compensation (IC) parameters or frame-rate up conversion (FRUC) parameters.

6. The method of claim 1, wherein the template sample is a first template sample and wherein the current face is a first face, further comprising:
identifying a second template sample associated with the current block; and
determining whether the second template sample is available for deriving the prediction parameters for the current block based on the frame-packing information, wherein the second template sample is determined to be available based on a condition that a second face that comprises the second template sample geometrically neighbors the first face.

7. The method of claim 1, wherein the template sample is a first template sample and wherein the current face is a first face, further comprising:
identifying a second template sample associated with the current block; and
determining whether the second template sample is available for deriving the prediction parameters for the current block based on the frame-packing information, wherein the second template sample is determined to be unavailable based on a condition that a second face that comprises the second template sample does not geometrically neighbor the first face.

8. The method of claim 1, wherein the plurality of faces arranged in the frame-packed picture are displayed in a multi-face projection format, wherein the multi-face projection format is a cubemap format, an octahedral format, or an icosahedral format.

9. An apparatus for video decoding, comprising:
a processor configured to:
obtain a 360-degree video content comprising a plurality of faces arranged in a frame-packed picture, wherein the plurality of faces comprise a current block in a current face;
identify a template sample associated with the current block based on frame-packing information of the 360-degree video content;
derive prediction parameters for the current block based on the template sample; and
predict the current block based on the derived prediction parameters.

10. The apparatus of claim 9, wherein the frame-packing information comprises an indication of locations and orientations of the plurality of the faces, and wherein the processor is further configured to:
identify a location and orientation of the template sample based on the locations and orientations of the plurality of the faces.

11. The apparatus of claim 9, wherein the frame-packing information comprises 3D geometry information of the 360-degree video content, and wherein the 3D geometry information is used to determine locations and orientations of the plurality of the faces, and wherein the processor is further configured to:
identify a location and orientation of the template sample based on the locations and orientations of the plurality of the faces.

12. The apparatus of claim 9, wherein the current face is a first face, and wherein the processor is further configured to:
determine that the current block is located at a boundary of the first face;
in response to determining that the current block is located at the boundary of the first face, identify a second face that comprises the template sample based on the frame-packing information; and
derive the prediction parameters using template-based coding for the current block based on the template sample if the second face is geometrically neighboring the first face.

13. The apparatus of claim 9, wherein the derived prediction parameters comprise illumination compensation (IC) parameters or frame-rate up conversion (FRUC) parameters.

14. The apparatus of claim 9, wherein the template sample is a first template sample and the current face is a first face, and wherein the processor is further configured to:
identify a second template sample associated with the current block; and
determine whether the second template sample is available for deriving the prediction parameters for the current block based on the frame-packing information, wherein the second template sample is determined to be available based on a condition that a second face that comprises the second template sample geometrically neighbors the first face.

15. The apparatus of claim 9, wherein the template sample is a first template sample and the current face is a first face, and wherein the processor is further configured to:
identify a second template sample associated with the current block; and
determine whether the second template sample is available for deriving the prediction parameters for the current block based on the frame-packing information, wherein the second template sample is determined to be unavailable based on a condition that a second face that comprises the second template sample does not geometrically neighbor the first face.

16. The apparatus of claim 9, wherein the plurality of faces arranged in the frame-packed picture are displayed in a multi-face projection format, wherein the multi-face projection format is a cubemap format, an octahedral format, or an icosahedral format.

17. A non-transitory computer readable storage medium including instructions for video decoding, the instructions causing one or more processors to perform:
obtaining a 360-degree video content comprising a plurality of faces arranged in a frame-packed picture, wherein the plurality of faces comprise a current block in a current face;
identifying a template sample associated with the current block based on frame-packing information of the 360-degree video content; and deriving prediction parameters for the current block based on the template sample; and predicting the current block based on the derived prediction parameters.

18. The non-transitory computer readable storage medium of claim 17, wherein the frame-packing information comprises an indication of locations and orientations of the plurality of the faces, and the identifying of the template sample further comprises:
identifying a location and orientation of the template sample based on the locations and orientations of the plurality of the faces.

19. The non-transitory computer readable storage medium of claim 17, wherein the frame-packing information comprises 3D geometry information of the 360-degree video content, and wherein the 3D geometry information is used to determine locations and orientations of the plurality of the faces, and the identifying of the template sample further comprises:
identifying a location and orientation of the template sample based on the locations and orientations of the plurality of the faces.

20. The non-transitory computer readable storage medium of claim 17, wherein the current face is a first face, and wherein the instructions further causing the one or more processors to perform:
determining that the current block is located at a boundary of the first face;
in response to determining that the current block is located at the boundary of the first face, identifying a second face that comprises the template sample based on the frame-packing information; and
deriving the prediction parameters using template-based coding for the current block based on the template sample.

* * * * *